US007706391B2

(12) United States Patent  (10) Patent No.: US 7,706,391 B2
Matsuo et al. (45) Date of Patent: Apr. 27, 2010

(54) PACKET TRANSMISSION METHOD AND DEVICE

(75) Inventors: Tamotsu Matsuo, Kawasaki (JP); Kenji Fukunaga, Kawasaki (JP); Toshihiro Koji, Kawasaki (JP); Masayuki Ogawa, Kawasaki (JP); Hiroshi Urano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 12/218,066

(22) Filed: Jul. 11, 2008

(65) Prior Publication Data
US 2009/0016350 A1 Jan. 15, 2009

(30) Foreign Application Priority Data
Jul. 12, 2007 (JP) ............................. 2007-183532

(51) Int. Cl.
*H04L 12/56* (2006.01)
(52) U.S. Cl. ...................................... 370/412; 370/475
(58) Field of Classification Search ................. 370/412, 370/475
See application file for complete search history.

(56) References Cited

U.S. PATENT DOCUMENTS 7,426,604 B1 *  9/2008  Rygh et al. ................. 711/101
2005/0100044 A1 *  5/2005  Sakamoto et al. ........... 370/463

FOREIGN PATENT DOCUMENTS

JP  10-327175   12/1998
JP  2000-78139   3/2000
JP  2001-298477  10/2001

* cited by examiner

*Primary Examiner*—Melvin Marcelo
(74) *Attorney, Agent, or Firm*—Staas & Halsey LLP

(57) ABSTRACT

In a packet transmission method and device, when a received packet is written in a packet buffer, an address of the packet buffer is stored as a read address for each destination corresponding to a physical port and storing information of the received packet. The read address of a destination designated by the received packet information is read and saved when the received packet is read out of the packet buffer in accordance with a scheduling control. Then, the saved read address is taken out in accordance with an arbitration control and a received packet corresponding to the saved read address is read from the packet buffer.

8 Claims, 41 Drawing Sheets

FIG.2A

| ADDRESS | DATA |
|---|---|
| 0 | PACKET STORAGE |
| 1 | PACKET STORAGE |
| 2 | PACKET STORAGE |
| 3 | : |
| : | : |
| m-2 | PACKET STORAGE |
| m-1 | PACKET STORAGE |
| m | PACKET STORAGE |

PACKET BUFFER 12

FIG.2B

| ADDRESS | DATA |
|---|---|
| 0 | CHAINED NEXT ADDRESS or FREE NEXT ADDRESS |
| 1 | CHAINED NEXT ADDRESS or FREE NEXT ADDRESS |
| 2 | CHAINED NEXT ADDRESS or FREE NEXT ADDRESS |
| 3 | : |
| : | : |
| m-2 | CHAINED NEXT ADDRESS or FREE NEXT ADDRESS |
| m-1 | CHAINED NEXT ADDRESS or FREE NEXT ADDRESS |
| m | CHAINED NEXT ADDRESS or FREE NEXT ADDRESS |

FREE ADDRESS/ADDRESS CHAIN SHARED MANAGING MEMORY 145

FIG.2C

| ADDRESS | DESTINATION | DATA |
|---|---|---|
| 0 | PHYSICAL PORT P#0 | HEAD PACKET STORAGE ADDRESS |
| 1 | PHYSICAL PORT P#1 | HEAD PACKET STORAGE ADDRESS |
| 2 | : | : |
| : | : | : |
| n | PHYSICAL PORT P#n | HEAD PACKET STORAGE ADDRESS |
|  | FREE AREA | HEAD PACKET ADDRESS |

HEAD ADDRESS MANAGING MEMORY 143

FIG.2D

| ADDRESS | DESTINATION | DATA |
|---|---|---|
| 0 | PHYSICAL PORT P#0 | TAIL PACKET STORAGE ADDRESS |
| 1 | PHYSICAL PORT P#1 | TAIL PACKET STORAGE ADDRESS |
| 2 | : | : |
| : | : | : |
| n | PHYSICAL PORT P#n | TAIL PACKET STORAGE ADDRESS |
|  | FREE AREA | TAIL PACKET ADDRESS |

TAIL ADDRESS MANAGING MEMORY 144

FIG.2E

| ADDRESS | DATA |
|---|---|
| 0 | READ ADDRESS STORAGE |
| 1 | READ ADDRESS STORAGE |
| 2 | READ ADDRESS STORAGE |
| 3 | : |
| : | : |
| x-2 | READ ADDRESS STORAGE |
| x-1 | READ ADDRESS STORAGE |
| x | READ ADDRESS STORAGE |

ADDRESS FIFO 202 (PER PHYSICAL PORT)

FIG.5A  PACKET BUFFER 12

| ADDRESS | DATA |
|---|---|
| 0 | FREE |
| 1 | FREE |
| 2 | FREE |
| 3 | FREE |
| 4 | FREE |
| 5 | FREE |
| 6 | FREE |
| 7 | FREE |
| 8 | FREE |
| 9 | FREE |
| ⋮ | ⋮ |
| ⋮ | ⋮ |
| n-2 | FREE |
| n-1 | FREE |
| n | FREE |

FIG.5B  FREE ADDRESS/ADDRESS CHAIN SHARED MANAGING MEMORY 145

| ADDRESS | DATA |
|---|---|
| 0 | FREE NEXT ADDRESS = 1 |
| 1 | FREE NEXT ADDRESS = 2 |
| 2 | FREE NEXT ADDRESS = 3 |
| 3 | FREE NEXT ADDRESS = 4 |
| 4 | FREE NEXT ADDRESS = 5 |
| 5 | FREE NEXT ADDRESS = 6 |
| 6 | FREE NEXT ADDRESS = 7 |
| 7 | FREE NEXT ADDRESS = 8 |
| 8 | FREE NEXT ADDRESS = 9 |
| 9 | FREE NEXT ADDRESS = 10 |
| ⋮ | ⋮ |
| ⋮ | ⋮ |
| n-2 | FREE NEXT ADDRESS = n-1 |
| n-1 | FREE NEXT ADDRESS = n |
| n | FREE NEXT ADDRESS = NONE |

FIG.5C  HEAD ADDRESS MANAGING MEMORY 143

| DESTINATION | DATA |
|---|---|
| A | HEAD ADDRESS = NONE |
| B | HEAD ADDRESS = NONE |
| C | HEAD ADDRESS = NONE |
| ⋮ | ⋮ |
| ⋮ | ⋮ |
| ⋮ | ⋮ |
| FREE | HEAD ADDRESS = 0 |

FIG.5D  TAIL ADDRESS MANAGING MEMORY 144

| DESTINATION | DATA |
|---|---|
| A | TAIL ADDRESS = NONE |
| B | TAIL ADDRESS = NONE |
| C | TAIL ADDRESS = NONE |
| ⋮ | ⋮ |
| ⋮ | ⋮ |
| ⋮ | ⋮ |
| FREE | TAIL ADDRESS = n |

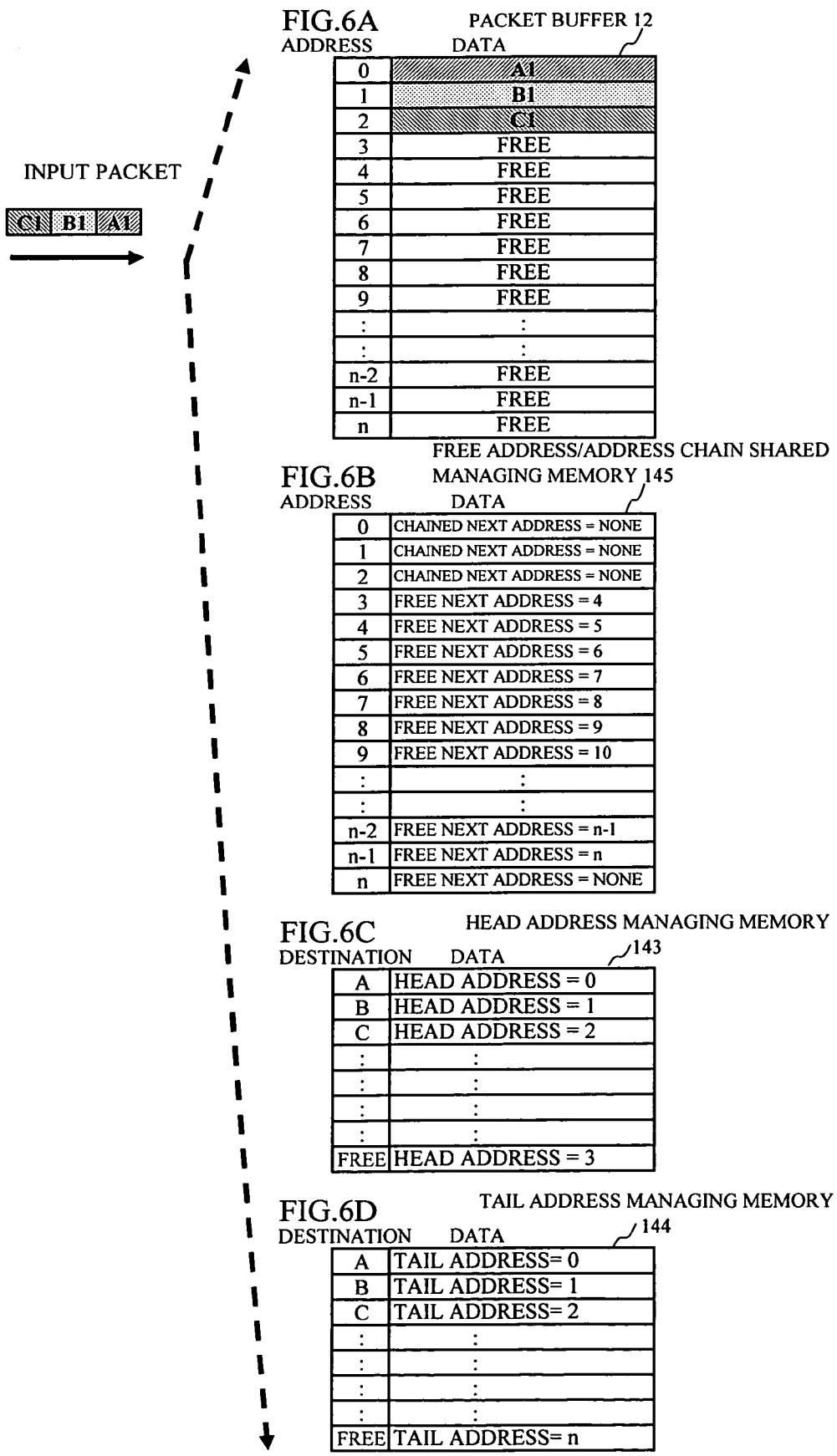

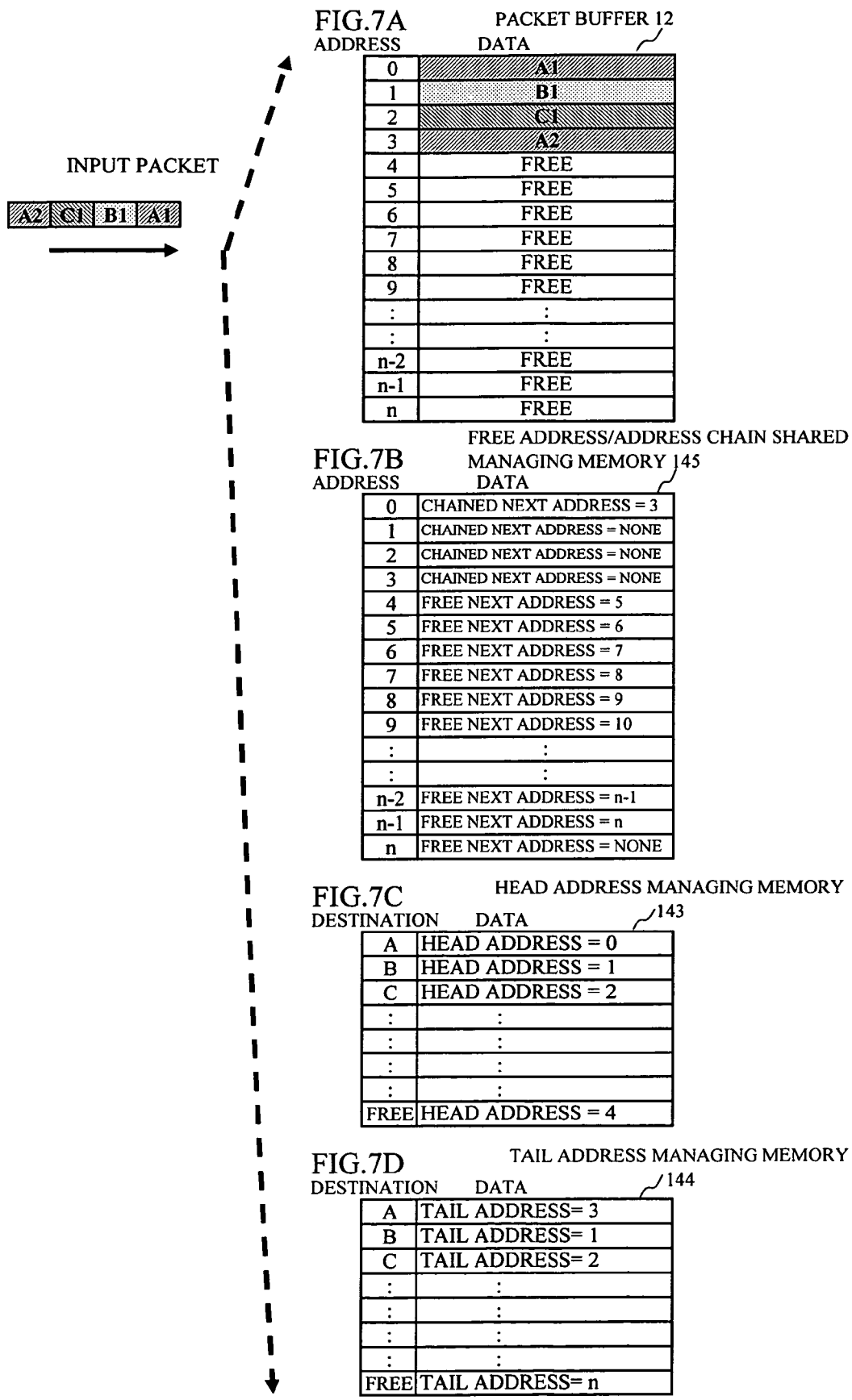

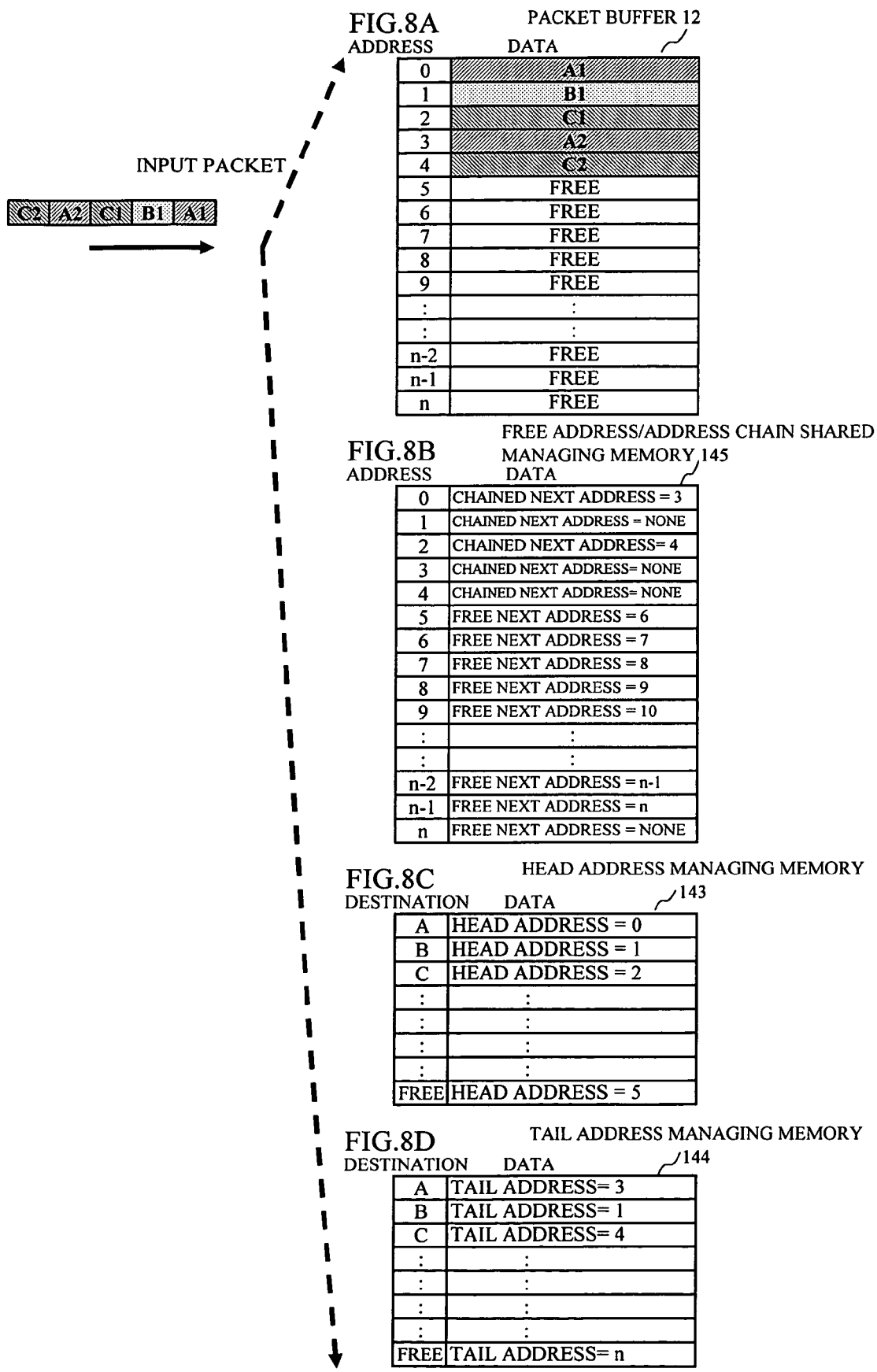

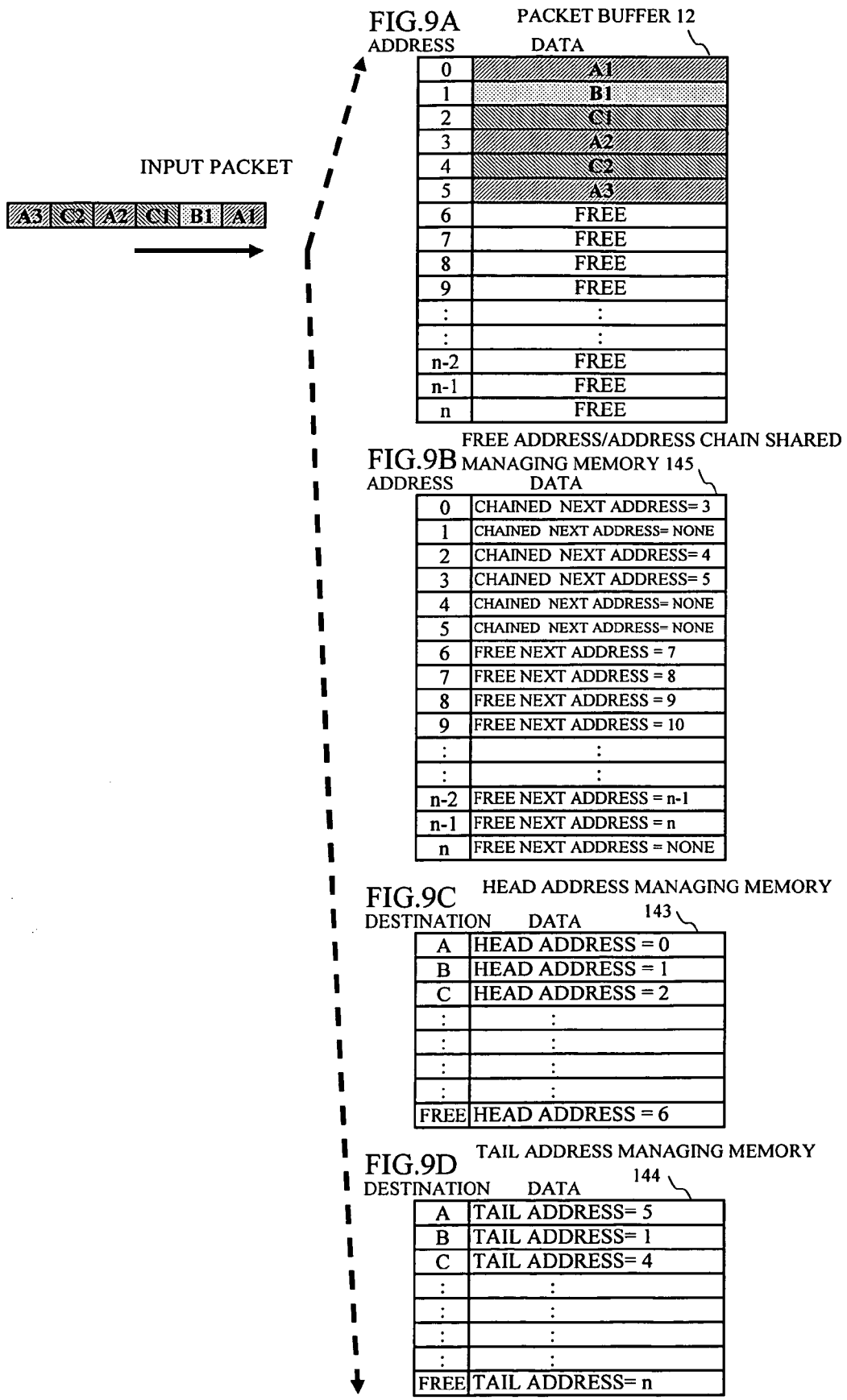

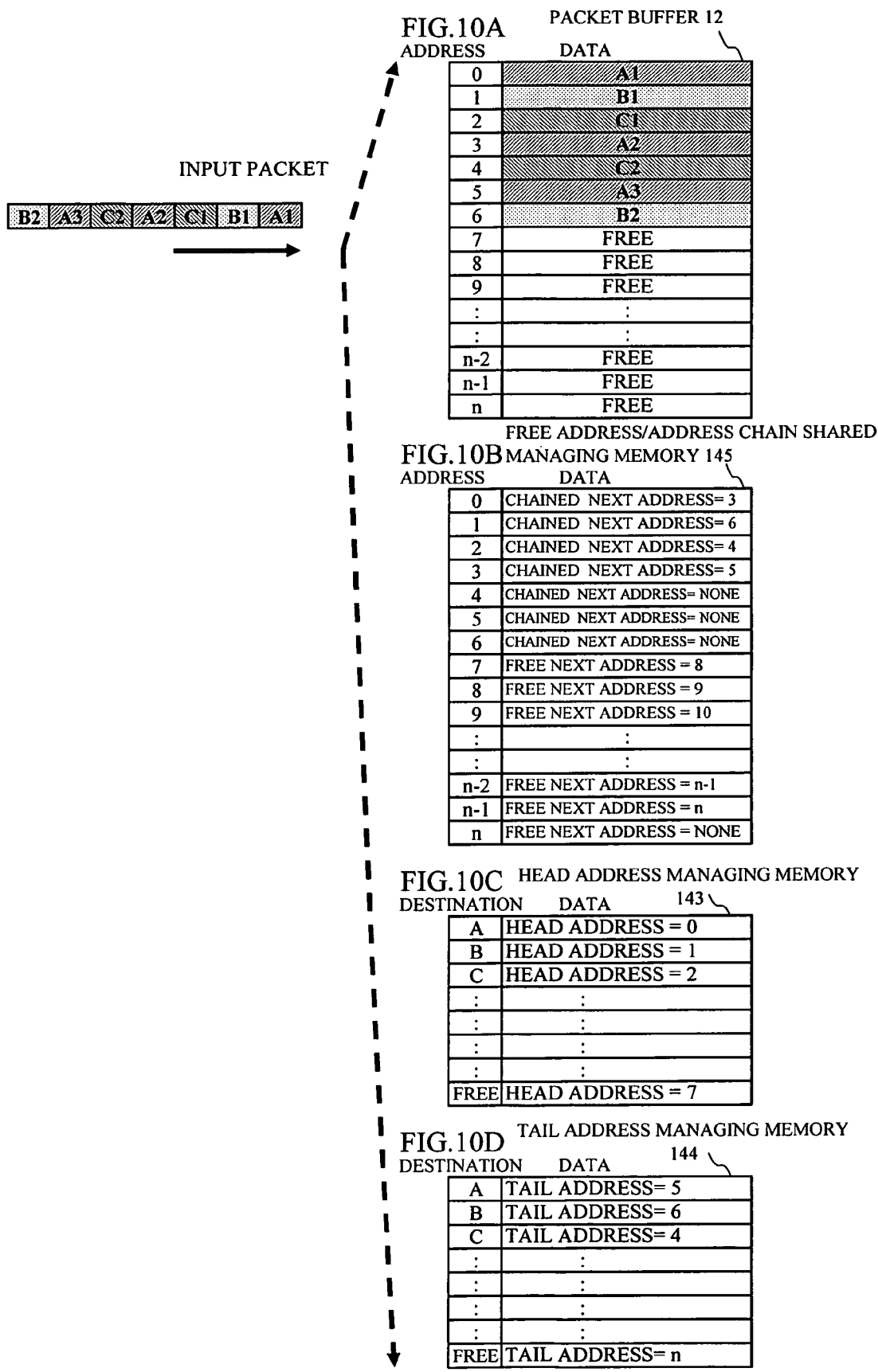

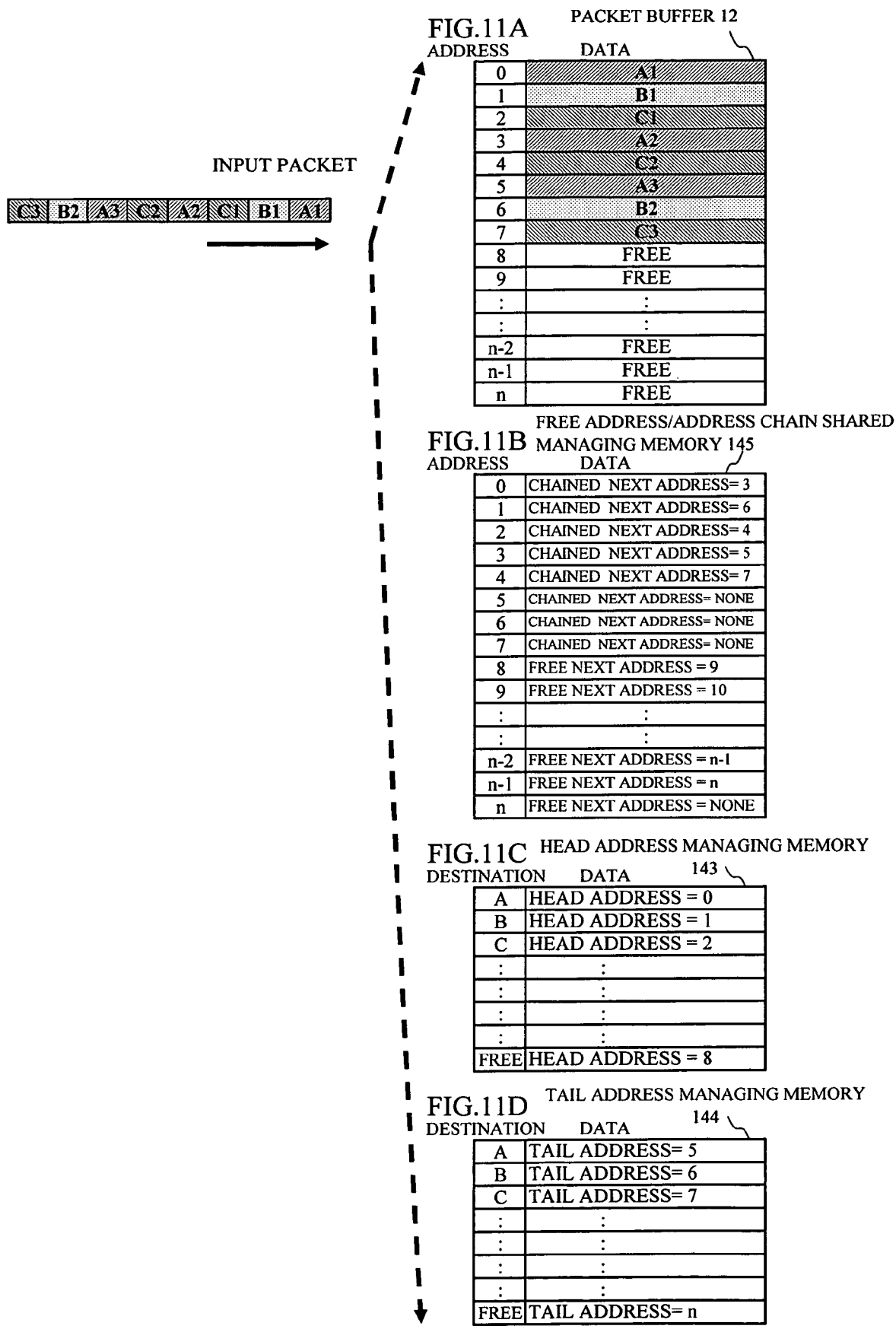

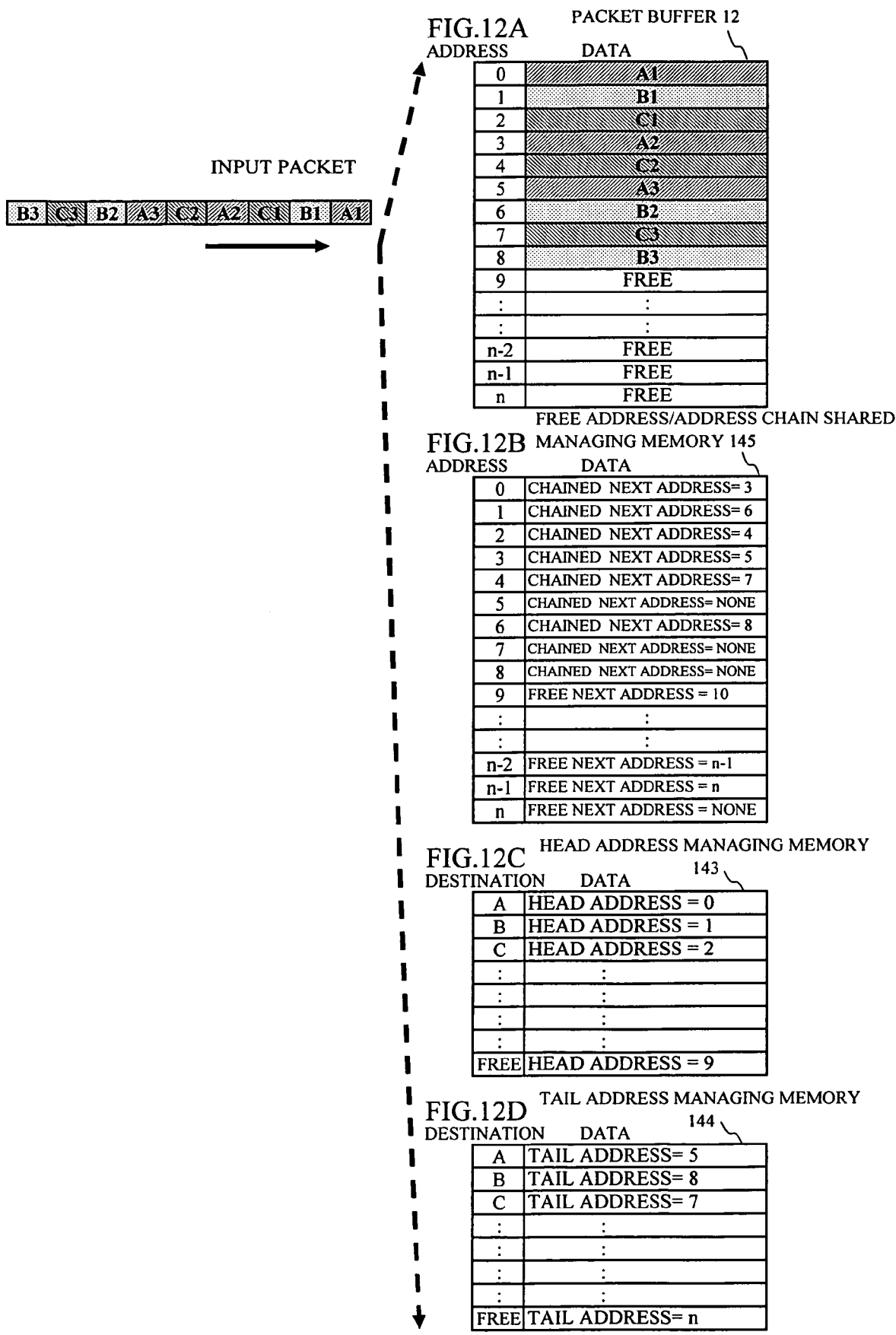

FIG.14A
PACKET BUFFER 12

| ADDRESS | DATA |
|---|---|
| 0 | FREE |
| 1 | B1 |
| 2 | C1 |
| 3 | A2 |
| 4 | C2 |
| 5 | A3 |
| 6 | B2 |
| 7 | C3 |
| 8 | B3 |
| 9 | FREE |
| : | : |
| : | : |
| n-2 | FREE |
| n-1 | FREE |
| n | FREE |

OUTPUT PACKET

A1

FIG.14B
FREE ADDRESS/ADDRESS CHAIN SHARED MANAGING MEMORY 145

| ADDRESS | DATA |
|---|---|
| 0 | FREE NEXT ADDRESS = NONE |
| 1 | CHAINED NEXT ADDRESS = 6 |
| 2 | CHAINED NEXT ADDRESS = 4 |
| 3 | CHAINED NEXT ADDRESS = 5 |
| 4 | CHAINED NEXT ADDRESS = 7 |
| 5 | CHAINED NEXT ADDRESS = NONE |
| 6 | CHAINED NEXT ADDRESS = 8 |
| 7 | CHAINED NEXT ADDRESS = NONE |
| 8 | CHAINED NEXT ADDRESS = NONE |
| 9 | FREE NEXT ADDRESS = 10 |
| : | : |
| : | : |
| n-2 | FREE NEXT ADDRESS = n-1 |
| n-1 | FREE NEXT ADDRESS = n |
| n | FREE NEXT ADDRESS = 0 |

FIG.14C
HEAD ADDRESS MANAGING MEMORY 143

| DESTINATION | DATA |
|---|---|
| A | HEAD ADDRESS = 3 |
| B | HEAD ADDRESS = 1 |
| C | HEAD ADDRESS = 2 |
| : | : |
| : | : |
| : | : |
| FREE | HEAD ADDRESS = 9 |

FIG.14D
TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| : | : |
| : | : |
| : | : |
| FREE | TAIL ADDRESS = 0 |

FIG.15A

PACKET BUFFER 12

| ADDRESS | DATA |
|---|---|
| 0 | FREE |
| 1 | B1 |
| 2 | C1 |
| 3 | FREE |
| 4 | C2 |
| 5 | A3 |
| 6 | B2 |
| 7 | C3 |
| 8 | B3 |
| 9 | FREE |
| : | : |
| : | : |
| n-2 | FREE |
| n-1 | FREE |
| n | FREE |

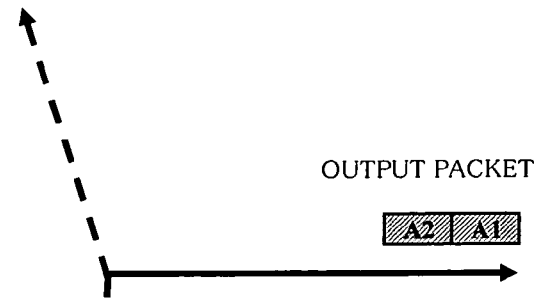

OUTPUT PACKET

FIG.15B

FREE ADDRESS/ADDRESS CHAIN SHARED MANAGING MEMORY 145

| ADDRESS | DATA |
|---|---|
| 0 | FREE NEXT ADDRESS = 3 |
| 1 | CHAINED NEXT ADDRESS = 6 |
| 2 | CHAINED NEXT ADDRESS = 4 |
| 3 | FREE NEXT ADDRESS = NONE |
| 4 | CHAINED NEXT ADDRESS = 7 |
| 5 | CHAINED NEXT ADDRESS = NONE |
| 6 | CHAINED NEXT ADDRESS = 8 |
| 7 | CHAINED NEXT ADDRESS = NONE |
| 8 | CHAINED NEXT ADDRESS = NONE |
| 9 | FREE NEXT ADDRESS = 10 |
| : | : |
| : | : |
| n-2 | FREE NEXT ADDRESS = n-1 |
| n-1 | FREE NEXT ADDRESS = n |
| n | FREE NEXT ADDRESS = 0 |

FIG.15C

HEAD ADDRESS MANAGING MEMORY 143

| DESTINATION | DATA |
|---|---|
| A | HEAD ADDRESS = 5 |
| B | HEAD ADDRESS = 1 |
| C | HEAD ADDRESS = 2 |
| : | : |
| : | : |
| : | : |
| FREE | HEAD ADDRESS = 9 |

FIG.15D

TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| : | : |
| : | : |
| FREE | TAIL ADDRESS = 3 |

FIG.16A
PACKET BUFFER 12

| ADDRESS | DATA |
|---|---|
| 0 | FREE |
| 1 | FREE |
| 2 | C1 |
| 3 | FREE |
| 4 | C2 |
| 5 | A3 |
| 6 | B2 |
| 7 | C3 |
| 8 | B3 |
| 9 | FREE |
| : | : |
| : | : |
| n-2 | FREE |
| n-1 | FREE |
| n | FREE |

OUTPUT PACKET

B1 A2 A1

FIG.16B
FREE ADDRESS/ADDRESS CHAIN SHARED MANAGING MEMORY 145

| ADDRESS | DATA |
|---|---|
| 0 | FREE NEXT ADDRESS = 3 |
| 1 | FREE NEXT ADDRESS = NONE |
| 2 | CHAINED NEXT ADDRESS = 4 |
| 3 | FREE NEXT ADDRESS = 1 |
| 4 | CHAINED NEXT ADDRESS = 7 |
| 5 | CHAINED NEXT ADDRESS = NONE |
| 6 | CHAINED NEXT ADDRESS = 8 |
| 7 | CHAINED NEXT ADDRESS = NONE |
| 8 | CHAINED NEXT ADDRESS = NONE |
| 9 | FREE NEXT ADDRESS = 10 |
| : | : |
| : | : |
| n-2 | FREE NEXT ADDRESS = n-1 |
| n-1 | FREE NEXT ADDRESS = n |
| n | FREE NEXT ADDRESS = 0 |

FIG.16C
HEAD ADDRESS MANAGING MEMORY 143

| DESTINATION | DATA |
|---|---|
| A | HEAD ADDRESS = 5 |
| B | HEAD ADDRESS = 6 |
| C | HEAD ADDRESS = 2 |
| : | : |
| : | : |
| : | : |
| FREE | HEAD ADDRESS = 9 |

FIG.16D
TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| : | : |
| : | : |
| : | : |
| FREE | TAIL ADDRESS = 1 |

FIG.17A
PACKET BUFFER 12

| ADDRESS | DATA |
|---|---|
| 0 | FREE |
| 1 | FREE |
| 2 | C1 |
| 3 | FREE |
| 4 | C2 |
| 5 | A3 |
| 6 | FREE |
| 7 | C3 |
| 8 | B3 |
| 9 | FREE |
| ⋮ | ⋮ |
| n-2 | FREE |
| n-1 | FREE |
| n | FREE |

OUTPUT PACKET

| B2 | B1 | A2 | A1 |

FIG.17B
FREE ADDRESS/ADDRESS CHAIN SHARED MANAGING MEMORY 145

| ADDRESS | DATA |
|---|---|
| 0 | FREE NEXT ADDRESS = 3 |
| 1 | FREE NEXT ADDRESS = 6 |
| 2 | CHAINED NEXT ADDRESS = 4 |
| 3 | FREE NEXT ADDRESS = 1 |
| 4 | CHAINED NEXT ADDRESS = 7 |
| 5 | CHAINED NEXT ADDRESS = NONE |
| 6 | FREE NEXT ADDRESS = NONE |
| 7 | CHAINED NEXT ADDRESS = NONE |
| 8 | CHAINED NEXT ADDRESS = NONE |
| 9 | FREE NEXT ADDRESS = 10 |
| ⋮ | ⋮ |
| n-2 | FREE NEXT ADDRESS = n-1 |
| n-1 | FREE NEXT ADDRESS = n |
| n | FREE NEXT ADDRESS = 0 |

FIG.17C
HEAD ADDRESS MANAGING MEMORY 143

| DESTINATION | DATA |
|---|---|
| A | HEAD ADDRESS = 5 |
| B | HEAD ADDRESS = 8 |
| C | HEAD ADDRESS = 2 |
| ⋮ | ⋮ |
| FREE | HEAD ADDRESS = 9 |

FIG.17D
TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| ⋮ | ⋮ |
| FREE | TAIL ADDRESS = 6 |

FIG.18A
PACKET BUFFER 12

| ADDRESS | DATA |
|---|---|
| 0 | FREE |
| 1 | FREE |
| 2 | FREE |
| 3 | FREE |
| 4 | C2 |
| 5 | A3 |
| 6 | FREE |
| 7 | C3 |
| 8 | B3 |
| 9 | FREE |
| ⋮ | ⋮ |
| n-2 | FREE |
| n-1 | FREE |
| n | FREE |

OUTPUT PACKET

| C1 | B2 | B1 | A2 | A1 |

FIG.18B
FREE ADDRESS/ADDRESS CHAIN SHARED MANAGING MEMORY 145

| ADDRESS | DATA |
|---|---|
| 0 | FREE NEXT ADDRESS = 3 |
| 1 | FREE NEXT ADDRESS = 6 |
| 2 | FREE NEXT ADDRESS = NONE |
| 3 | FREE NEXT ADDRESS = 1 |
| 4 | CHAINED NEXT ADDRESS = 7 |
| 5 | CHAINED NEXT ADDRESS = NONE |
| 6 | FREE NEXT ADDRESS = 2 |
| 7 | CHAINED NEXT ADDRESS = NONE |
| 8 | CHAINED NEXT ADDRESS = NONE |
| 9 | FREE NEXT ADDRESS = 10 |
| ⋮ | ⋮ |
| n-2 | FREE NEXT ADDRESS = n-1 |
| n-1 | FREE NEXT ADDRESS = n |
| n | FREE NEXT ADDRESS = 0 |

FIG.18C
HEAD ADDRESS MANAGING MEMORY 143

| DESTINATION | DATA |
|---|---|
| A | HEAD ADDRESS = 5 |
| B | HEAD ADDRESS = 8 |
| C | HEAD ADDRESS = 4 |
| ⋮ | ⋮ |
| FREE | HEAD ADDRESS = 9 |

FIG.18D
TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| ⋮ | ⋮ |
| FREE | TAIL ADDRESS = 2 |

FIG.19A
PACKET BUFFER 12

| ADDRESS | DATA |
|---|---|
| 0 | FREE |
| 1 | FREE |
| 2 | FREE |
| 3 | FREE |
| 4 | FREE |
| 5 | A3 |
| 6 | FREE |
| 7 | C3 |
| 8 | B3 |
| 9 | FREE |
| ⋮ | ⋮ |
| n-2 | FREE |
| n-1 | FREE |
| n | FREE |

OUTPUT PACKET

| C2 | C1 | B2 | B1 | A2 | A1 |

FIG.19B
FREE ADDRESS/ADDRESS CHAIN SHARED MANAGING MEMORY 145

| ADDRESS | DATA |
|---|---|
| 0 | FREE NEXT ADDRESS = 3 |
| 1 | FREE NEXT ADDRESS = 6 |
| 2 | FREE NEXT ADDRESS = 4 |
| 3 | FREE NEXT ADDRESS = 1 |
| 4 | FREE NEXT ADDRESS = NONE |
| 5 | CHAINED NEXT ADDRESS = NONE |
| 6 | FREE NEXT ADDRESS = 2 |
| 7 | CHAINED NEXT ADDRESS = NONE |
| 8 | CHAINED NEXT ADDRESS = NONE |
| 9 | FREE NEXT ADDRESS = 10 |
| ⋮ | ⋮ |
| n-2 | FREE NEXT ADDRESS = n-1 |
| n-1 | FREE NEXT ADDRESS = n |
| n | FREE NEXT ADDRESS = 0 |

FIG.19C
HEAD ADDRESS MANAGING MEMORY 143

| DESTINATION | DATA |
|---|---|
| A | HEAD ADDRESS = 5 |
| B | HEAD ADDRESS = 8 |
| C | HEAD ADDRESS = 7 |
| ⋮ | ⋮ |
| FREE | HEAD ADDRESS = 9 |

FIG.19D
TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| ⋮ | ⋮ |
| FREE | TAIL ADDRESS = 4 |

PRIOR ART

FIG.22A

PACKET BUFFER 12

| Address | DATA |
|---|---|
| 0 | PACKET STORAGE |
| 1 | PACKET STORAGE |
| 2 | PACKET STORAGE |
| 3 | ⋮ |
| ⋮ | ⋮ |
| m-2 | PACKET STORAGE |
| m-1 | PACKET STORAGE |
| m | PACKET STORAGE |

FIG.22B

FREE ADDRESS MANAGING MEMORY 141

| ADDRESS | DATA |
|---|---|
| 0 | FREE ADDRESS |
| 1 | FREE ADDRESS |
| 2 | FREE ADDRESS |
| 3 | ⋮ |
| ⋮ | ⋮ |
| m-2 | FREE ADDRESS |
| m-1 | FREE ADDRESS |
| m | FREE ADDRESS |

FIG.22C

ADDRESS CHAIN MANAGING MEMORY 142

| ADDRESS | DATA |
|---|---|
| 0 | CHAINED NEXT ADDRESS |
| 1 | CHAINED NEXT ADDRESS |
| 2 | CHAINED NEXT ADDRESS |
| 3 | ⋮ |
| ⋮ | ⋮ |
| m-2 | CHAINED NEXT ADDRESS |
| m-1 | CHAINED NEXT ADDRESS |
| m | CHAINED NEXT ADDRESS |

FIG.22D

HEAD ADDRESS MANAGING MEMORY 143

| ADDRESS | DESTINATION | DATA |
|---|---|---|
| 0 | PHYSICAL PORT P#0 | HEAD PACKET STORAGE ADDRESS |
| 1 | PHYSICAL PORT P#1 | HEAD PACKET STORAGE ADDRESS |
| 2 | ⋮ | ⋮ |
| ⋮ | ⋮ | ⋮ |
| n | PHYSICAL PORT P#n | HEAD PACKET STORAGE ADDRESS |

FIG.22E

TAIL ADDRESS MANAGING MEMORY 144

| ADDRESS | DESTINATION | DATA |
|---|---|---|
| 0 | PHYSICAL PORT P#0 | TAIL PACKET STORAGE ADDRESS |
| 1 | PHYSICAL PORT P#1 | TAIL PACKET STORAGE ADDRESS |
| 2 | ⋮ | ⋮ |
| ⋮ | ⋮ | ⋮ |
| n | PHYSICAL PORT P#n | TAIL PACKET STORAGE ADDRESS |

FIG.22F

PACKET FIFO 162 (PER PHYSICAL PORT)

| ADDRESS | DATA |
|---|---|
| 0 | PACKET STORAGE |
| 1 | PACKET STORAGE |
| 2 | PACKET STORAGE |
| 3 | ⋮ |
| ⋮ | ⋮ |
| x-2 | PACKET STORAGE |
| x-1 | PACKET STORAGE |
| x | PACKET STORAGE |

FIG.23

PRIOR ART

PACKET HEADER (DESTINATION PHYSICAL PORT NO., PACKET LENGTH etc.)

PACKET BODY (VARIABLE LENGTH OF 60 −9200 BYTES)

PRIOR ART

FIG.26A

PACKET BUFFER 12

| ADDRESS | DATA |
|---|---|
| 0 | FREE |
| 1 | FREE |
| 2 | FREE |
| 3 | FREE |
| 4 | FREE |
| 5 | FREE |
| 6 | FREE |
| 7 | FREE |
| 8 | FREE |
| 9 | FREE |
| : | : |
| : | : |
| n-2 | FREE |
| n-1 | FREE |
| n | FREE |

FIG.26B

FREE ADDRESS MANAGING MEMORY 141

READ ADDRESS COUNT RAC =>

| ADDRESS | DATA |
|---|---|
| 0 | 0 (AVAILABLE) |
| 1 | 1 (AVAILABLE) |
| 2 | 2 (AVAILABLE) |
| 3 | 3 (AVAILABLE) |
| 4 | 4 (AVAILABLE) |
| 5 | 5 (AVAILABLE) |
| 6 | 6 (AVAILABLE) |
| 7 | 7 (AVAILABLE) |
| 8 | 8 (AVAILABLE) |
| 9 | 9 (AVAILABLE) |
| : | : |
| : | : |
| n-2 | n-2 (AVAILABLE) |
| n-1 | n-1 (AVAILABLE) |
| n | n (AVAILABLE) |

<= WAC WRITE ADDRESS COUNT

FIG.26C

ADDRESS CHAIN MANAGING MEMORY 142

| ADDRESS | DATA |
|---|---|
| 0 | CHAINED NEXT ADDRESS = NONE |
| 1 | CHAINED NEXT ADDRESS = NONE |
| 2 | CHAINED NEXT ADDRESS = NONE |
| 3 | CHAINED NEXT ADDRESS = NONE |
| 4 | CHAINED NEXT ADDRESS = NONE |
| 5 | CHAINED NEXT ADDRESS = NONE |
| 6 | CHAINED NEXT ADDRESS = NONE |
| 7 | CHAINED NEXT ADDRESS = NONE |
| 8 | CHAINED NEXT ADDRESS = NONE |
| 9 | : |
| : | : |
| : | : |
| n-2 | : |
| n-1 | : |
| n | : |

FIG.26D

HEAD ADDRESS MANAGING MEMORY 143

| DESTINATION | DATA |
|---|---|
| A | HEAD ADDESS = NONE |
| B | HEAD ADDESS = NONE |
| C | HEAD ADDESS = NONE |
| : | : |
| : | : |
| : | : |
| : | : |
| : | : |

FIG.26E

TAIL ADDRESS MANAGING MEMORY 144

| DESTINATION | DATA |
|---|---|
| A | TAIL ADDESS = NONE |
| B | TAIL ADDESS = NONE |
| C | TAIL ADDESS = NONE |
| : | : |
| : | : |
| : | : |
| : | : |
| : | : |

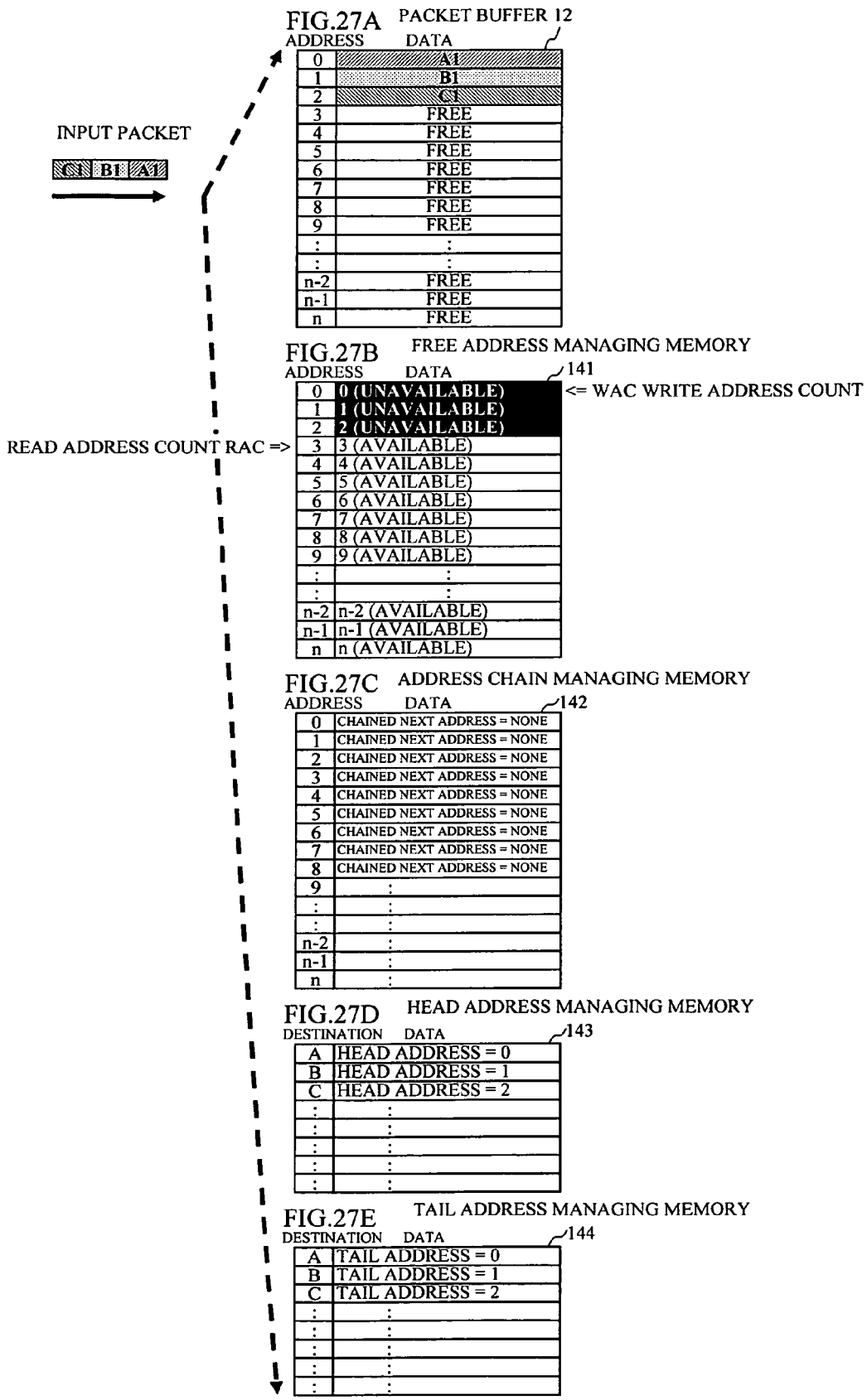

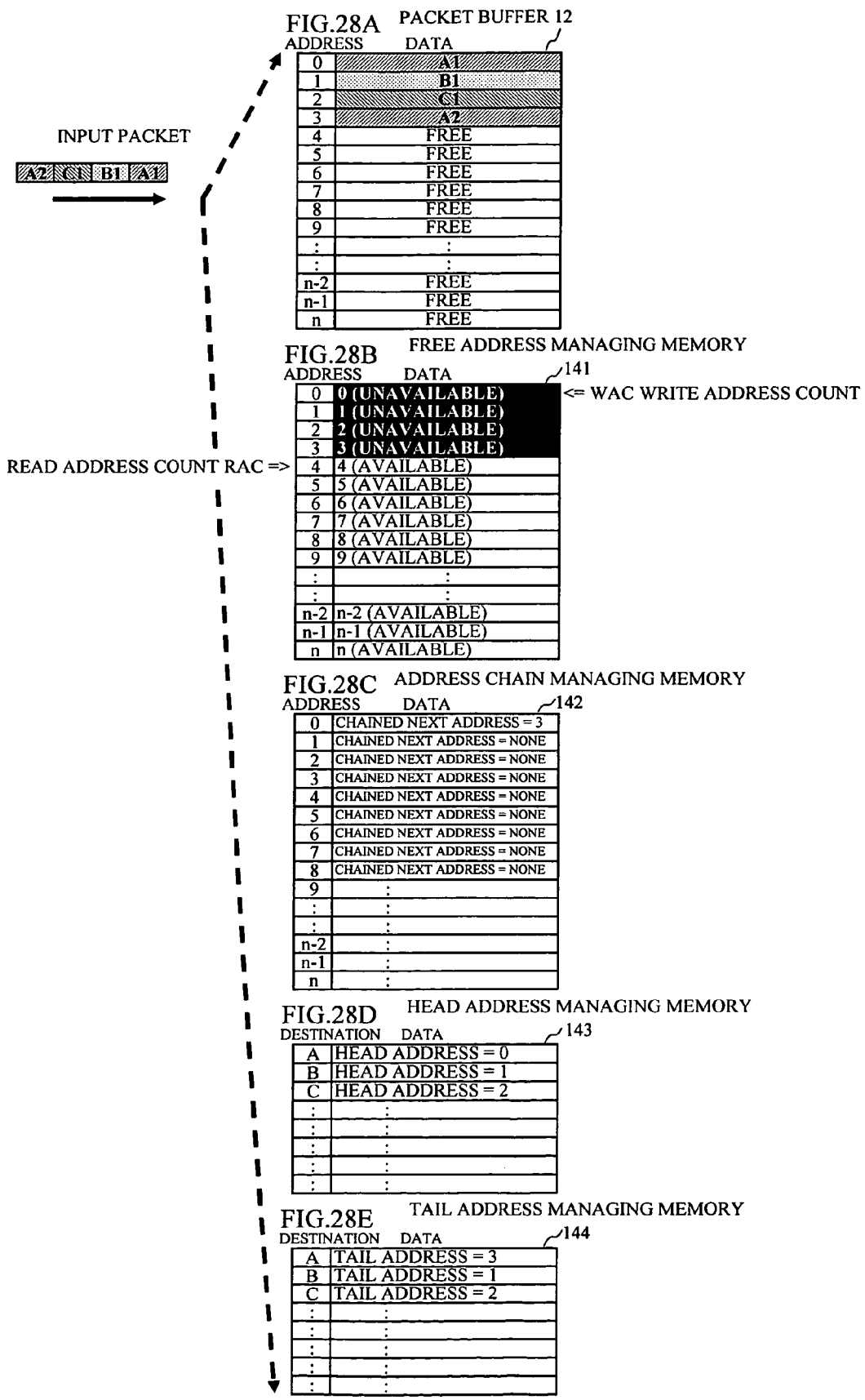

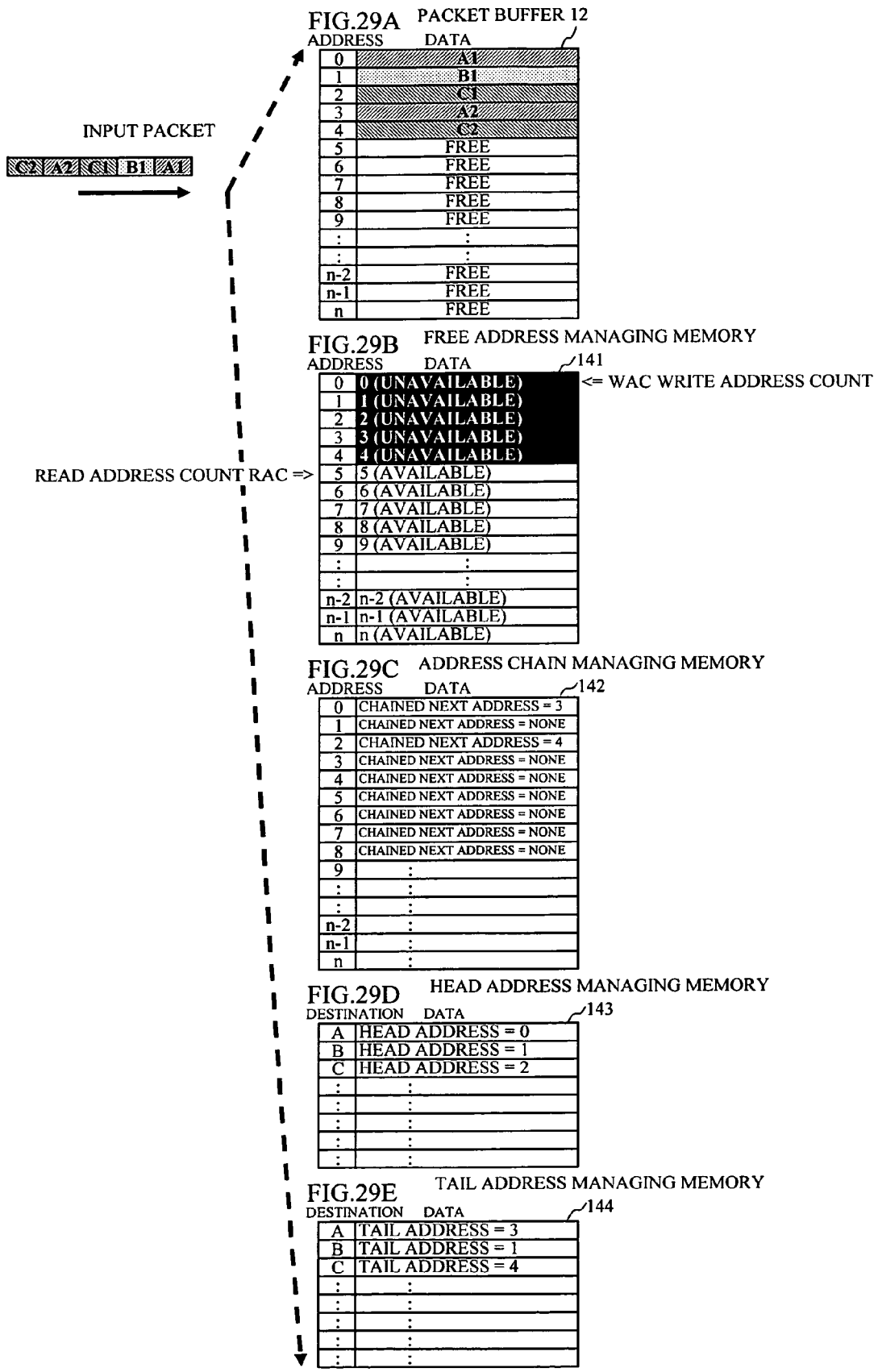

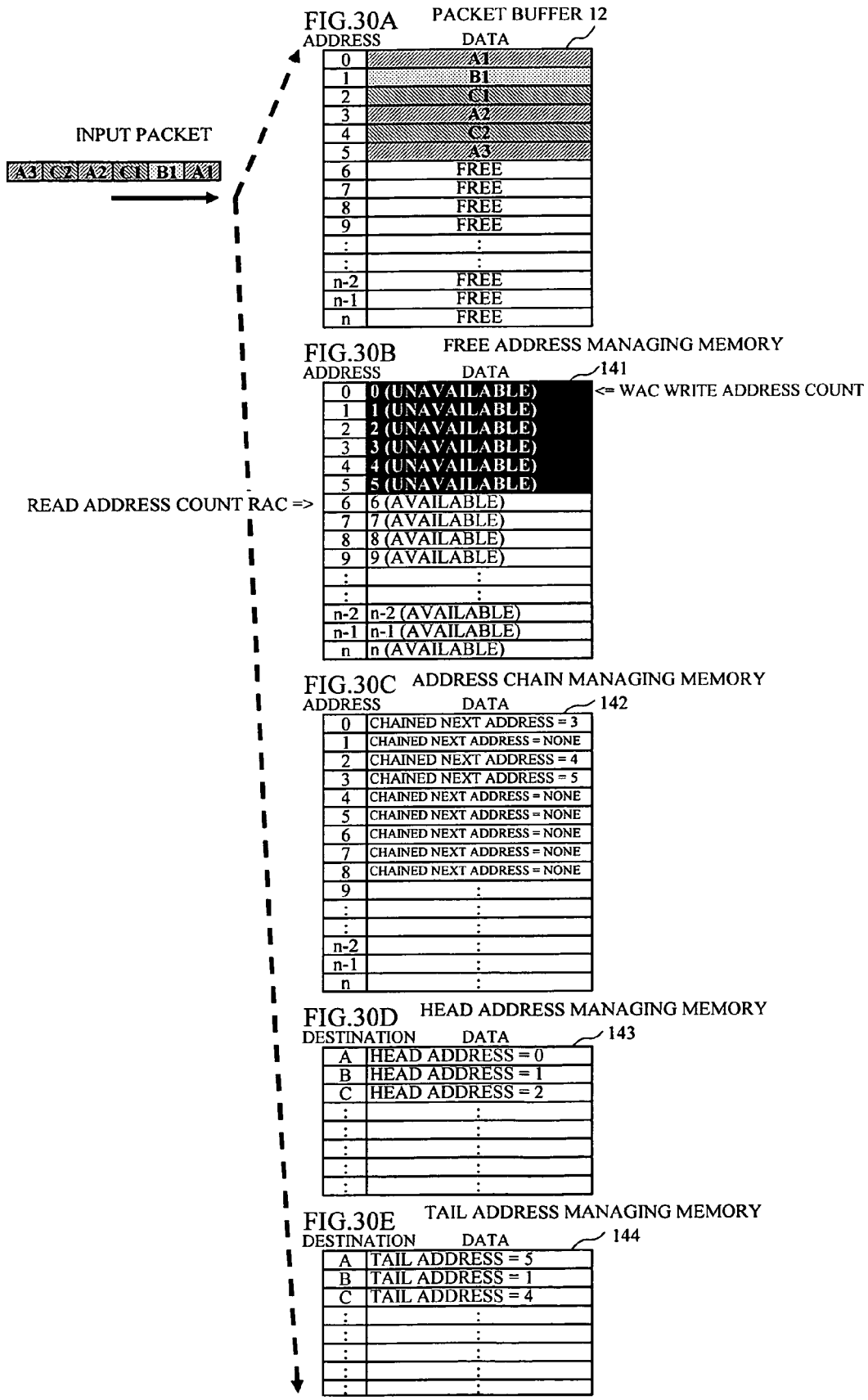

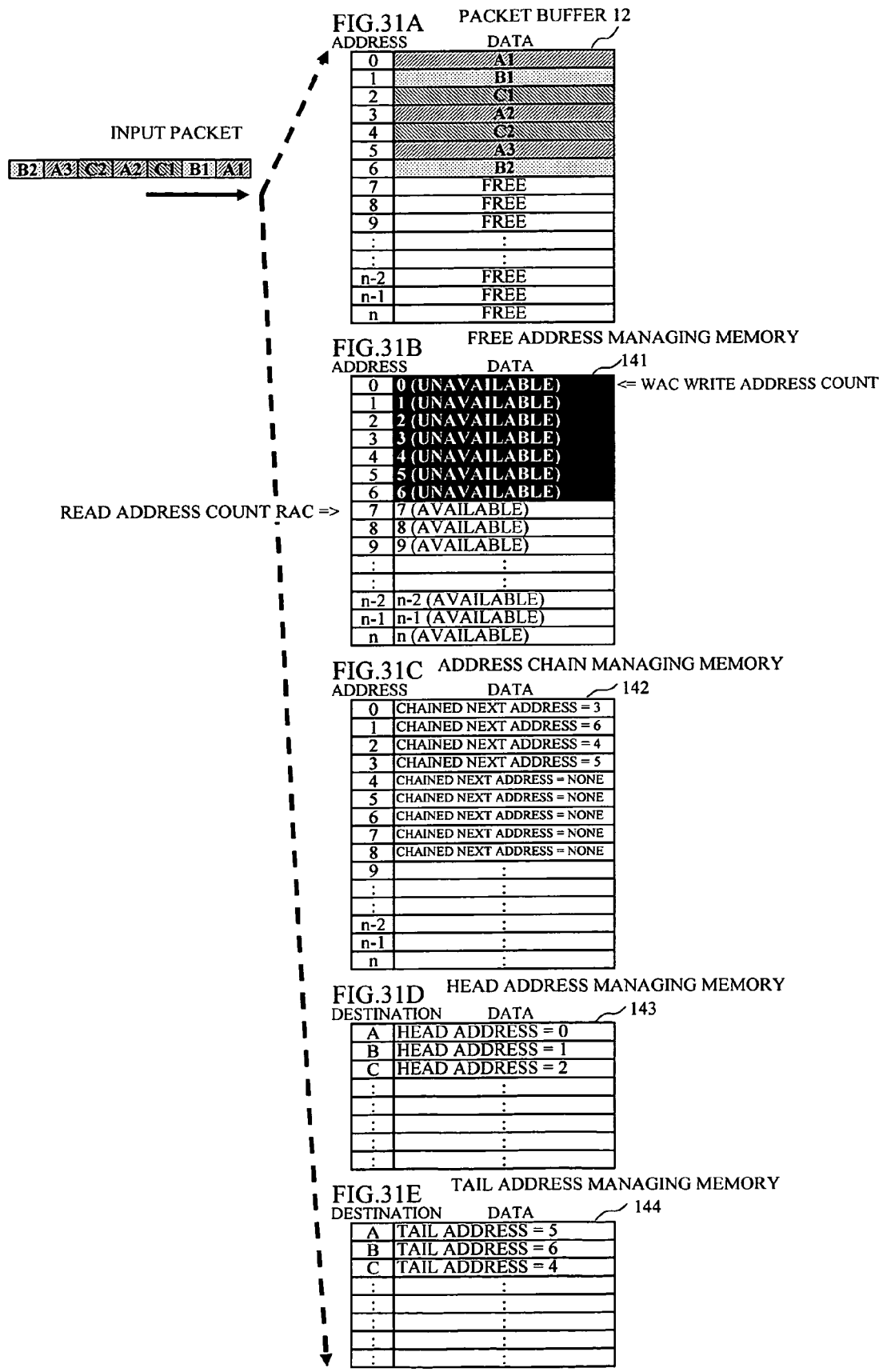

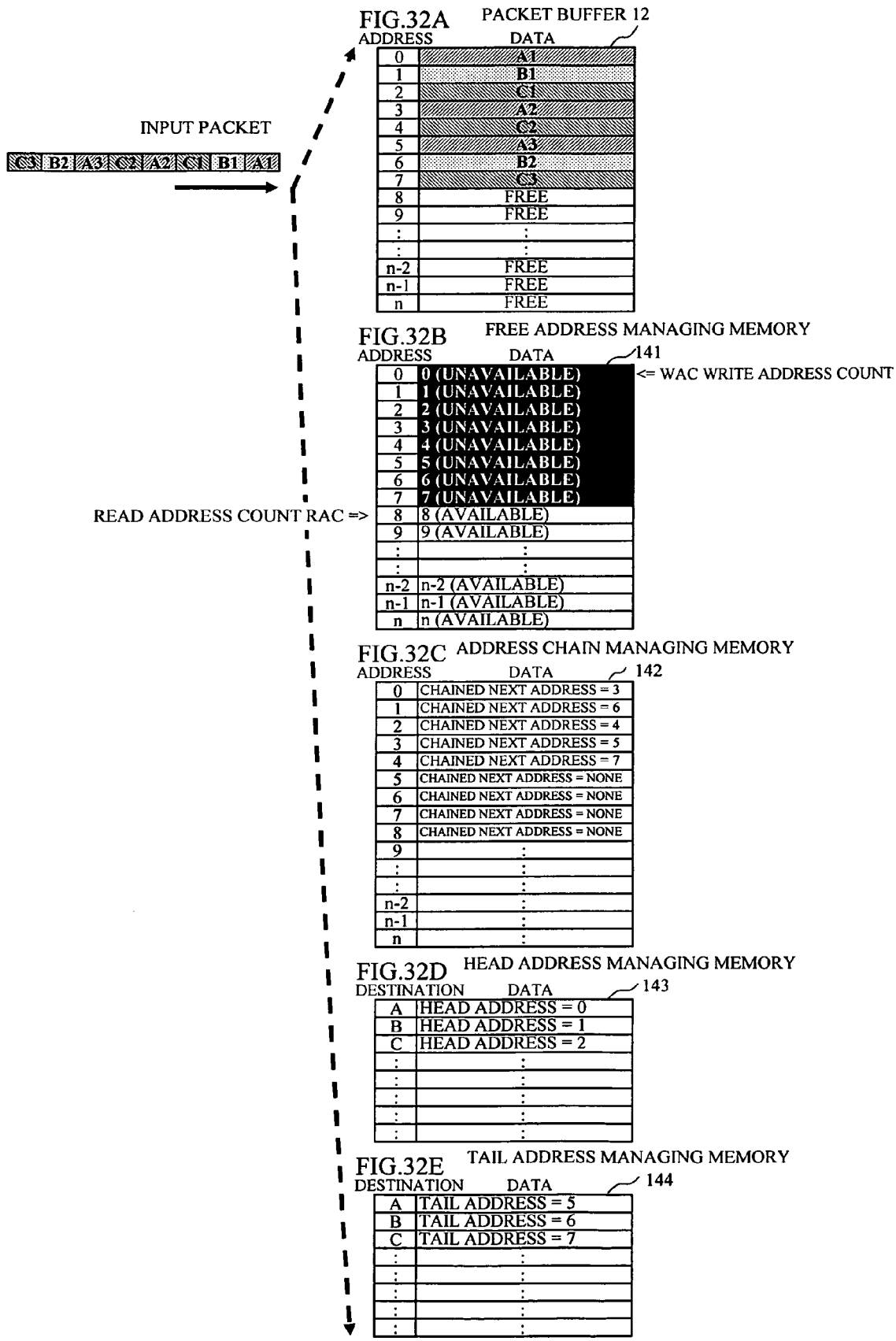

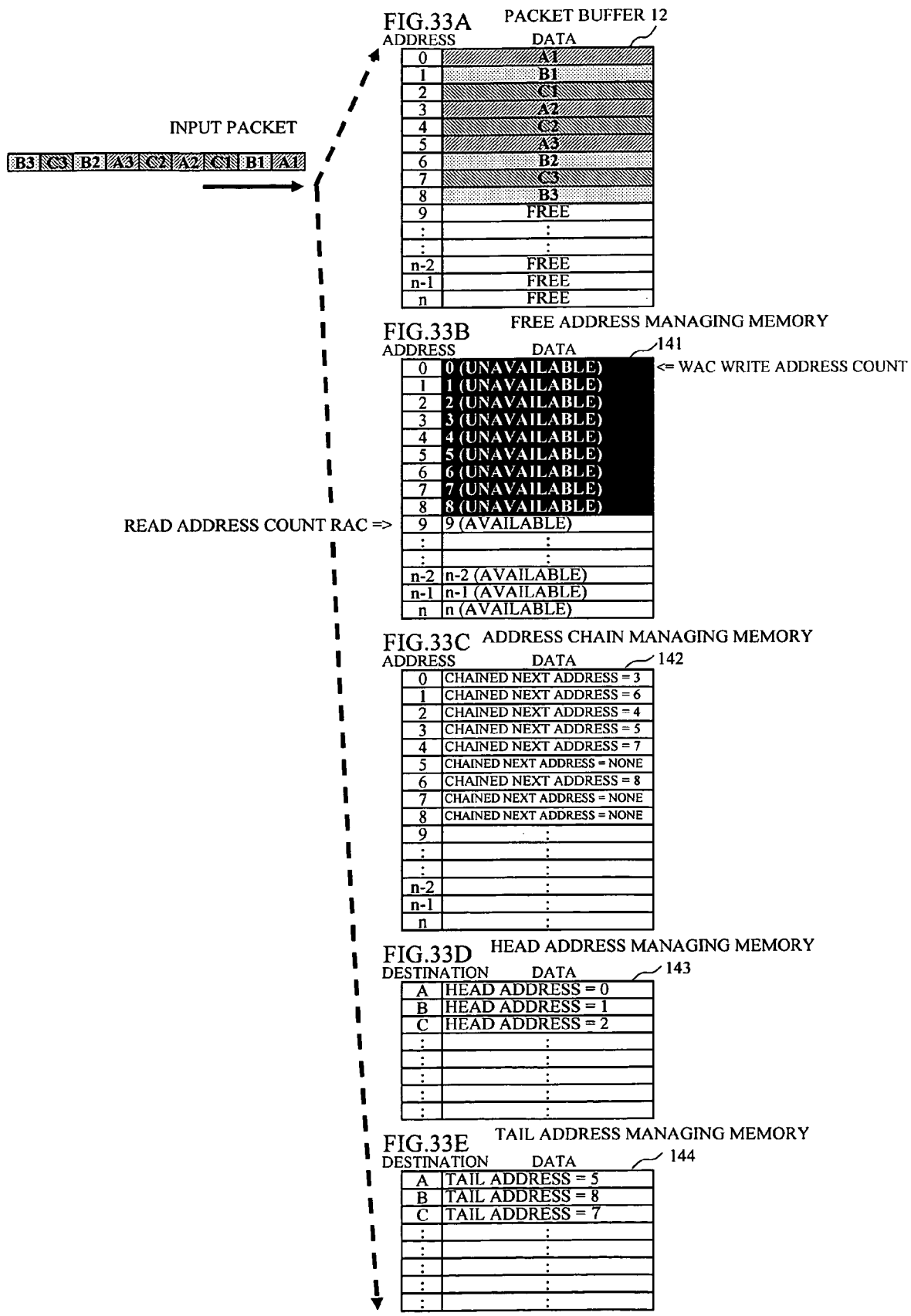

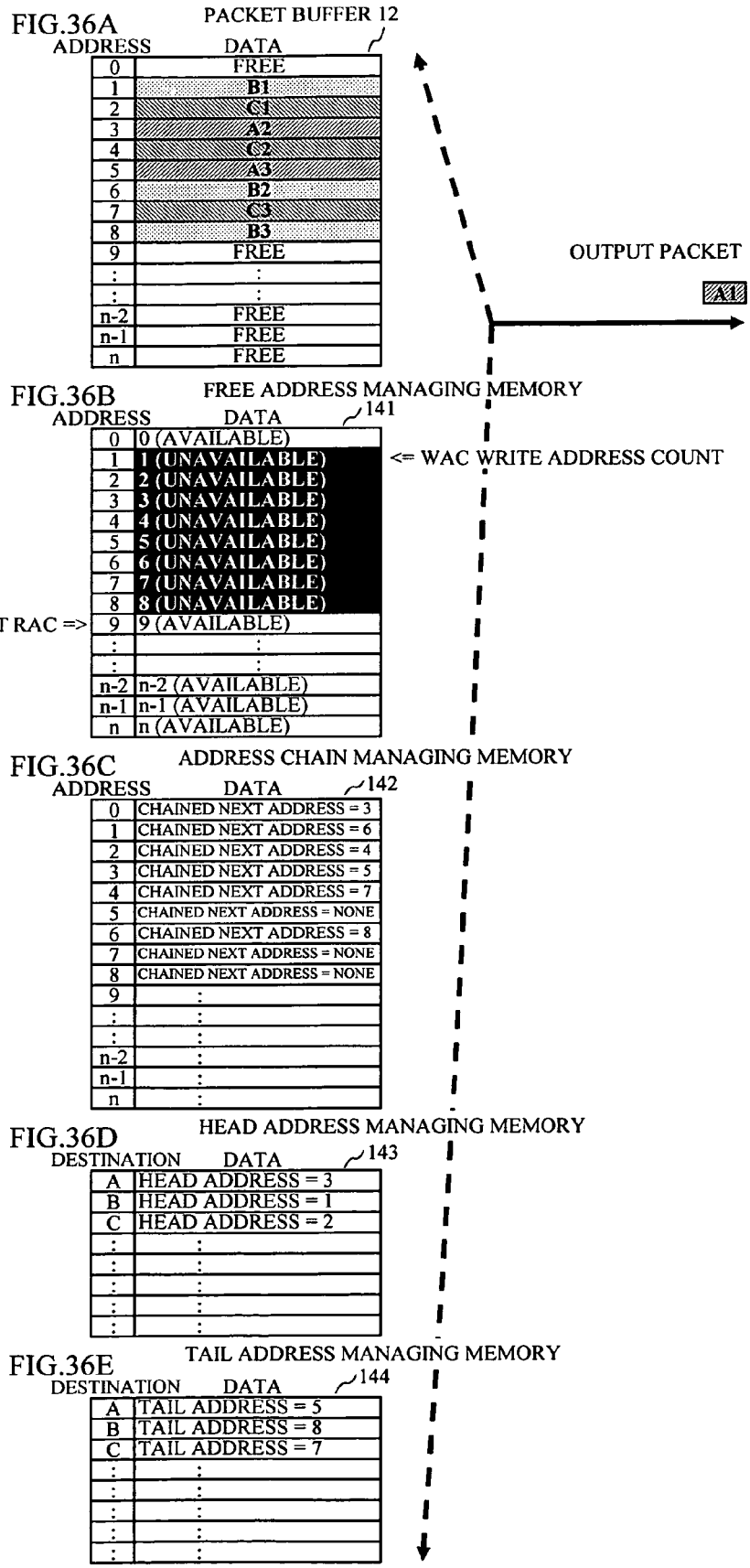

PRIOR ART

FIG. 37A PACKET BUFFER 12

| ADDRESS | DATA |
|---|---|
| 0 | FREE |
| 1 | B1 |
| 2 | C1 |
| 3 | FREE |
| 4 | C2 |
| 5 | A3 |
| 6 | B2 |
| 7 | C3 |
| 8 | B3 |
| 9 | FREE |
| : | : |
| n-2 | FREE |
| n-1 | FREE |
| n | FREE |

OUTPUT PACKET 

FIG. 37B FREE ADDRESS MANAGING MEMORY 141

| ADDRESS | DATA | |
|---|---|---|
| 0 | 0 (AVAILABLE) | |
| 1 | 3 (AVAILABLE) | |
| 2 | 2 (UNAVAILABLE) | <= WAC WRITE ADDRESS COUNT |
| 3 | 3 (UNAVAILABLE) | |
| 4 | 4 (UNAVAILABLE) | |
| 5 | 5 (UNAVAILABLE) | |
| 6 | 6 (UNAVAILABLE) | |
| 7 | 7 (UNAVAILABLE) | |
| 8 | 8 (UNAVAILABLE) | |
| READ ADDRESS COUNT RAC => 9 | 9 (AVAILABLE) | |
| : | : | |
| n-2 | n-2 (AVAILABLE) | |
| n-1 | n-1 (AVAILABLE) | |
| n | n (AVAILABLE) | |

FIG. 37C ADDRESS CHAIN MANAGING MEMORY 142

| ADDRESS | DATA |
|---|---|
| 0 | CHAINED NEXT ADDRESS = 3 |
| 1 | CHAINED NEXT ADDRESS = 6 |
| 2 | CHAINED NEXT ADDRESS = 4 |
| 3 | CHAINED NEXT ADDRESS = 5 |
| 4 | CHAINED NEXT ADDRESS = 7 |
| 5 | CHAINED NEXT ADDRESS = NONE |
| 6 | CHAINED NEXT ADDRESS = 8 |
| 7 | CHAINED NEXT ADDRESS = NONE |
| 8 | CHAINED NEXT ADDRESS = NONE |
| 9 | : |
| : | : |
| n-2 | : |
| n-1 | : |
| n | : |

FIG. 37D HEAD ADDRESS MANAGING MEMORY 143

| DESTINATION | DATA |
|---|---|
| A | HEAD ADDRESS = 5 |
| B | HEAD ADDRESS = 1 |
| C | HEAD ADDRESS = 2 |
| : | : |

FIG. 37E TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| : | : |

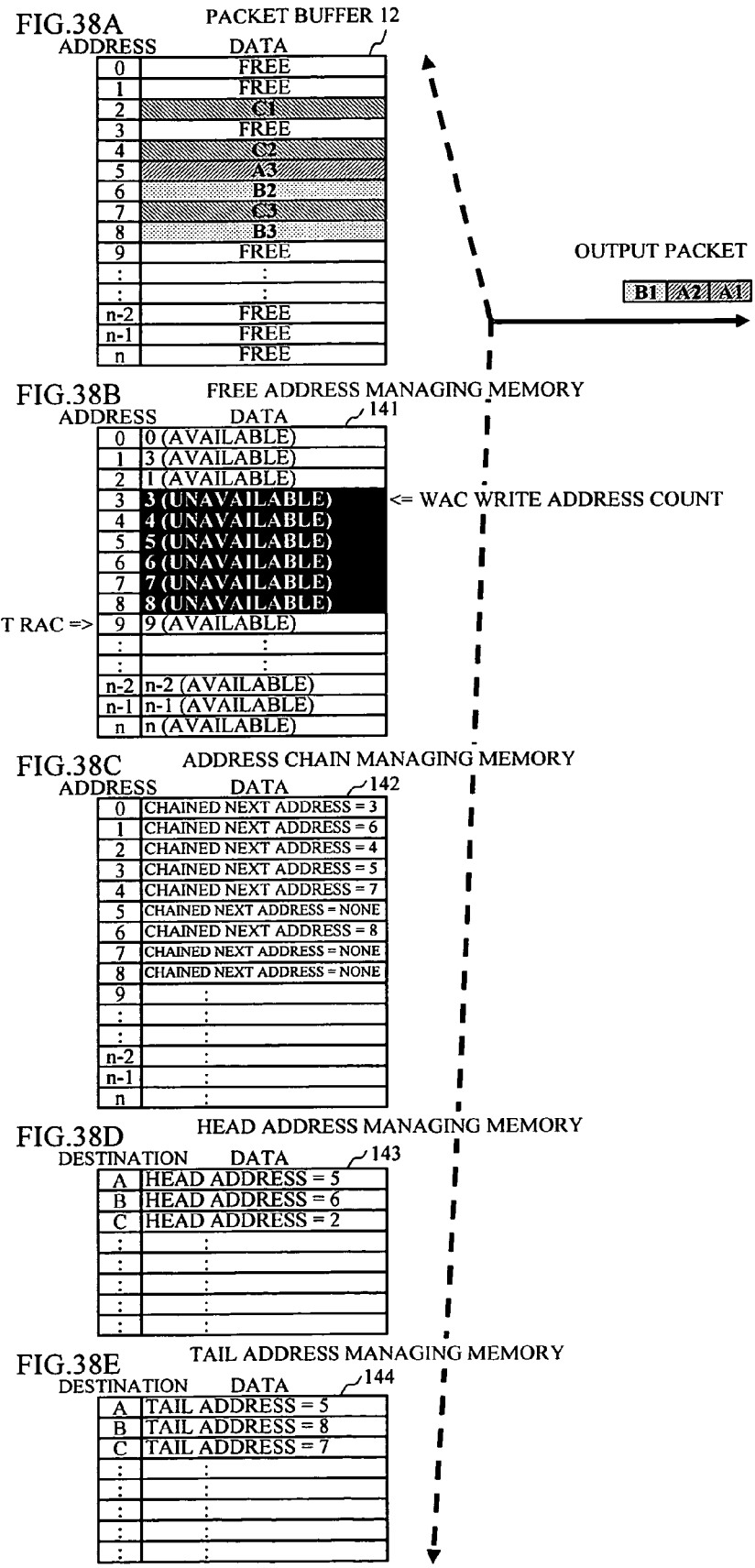

PRIOR ART
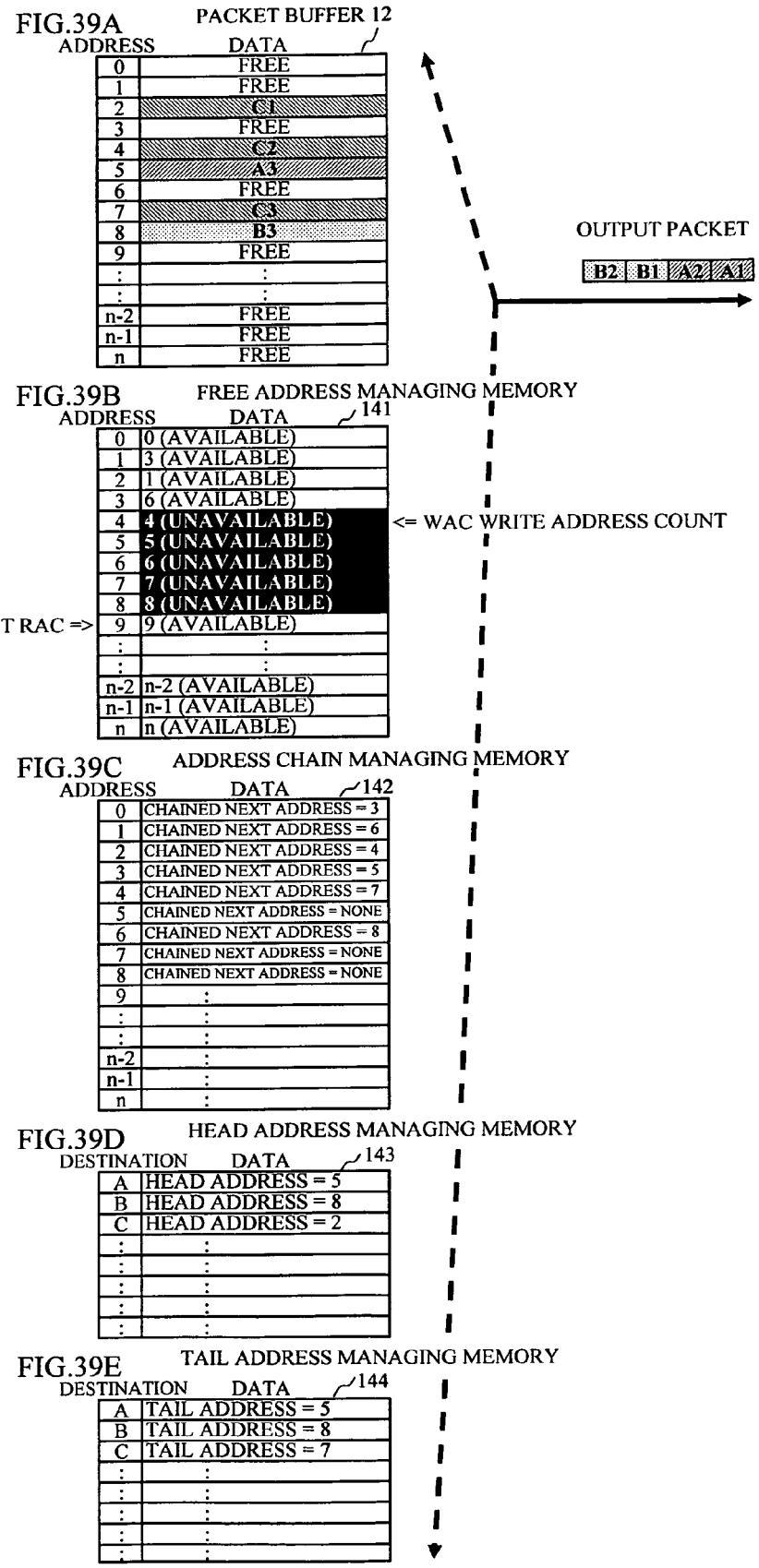
FIG.39A PACKET BUFFER 12
FIG.39B FREE ADDRESS MANAGING MEMORY
FIG.39C ADDRESS CHAIN MANAGING MEMORY
FIG.39D HEAD ADDRESS MANAGING MEMORY
FIG.39E TAIL ADDRESS MANAGING MEMORY

PRIOR ART

FIG.40A PACKET BUFFER 12

| ADDRESS | DATA |
|---|---|
| 0 | FREE |
| 1 | FREE |
| 2 | FREE |
| 3 | FREE |
| 4 | C2 |
| 5 | A3 |
| 6 | FREE |
| 7 | C3 |
| 8 | B3 |
| 9 | FREE |
| : | : |
| n-2 | FREE |
| n-1 | FREE |
| n | FREE |

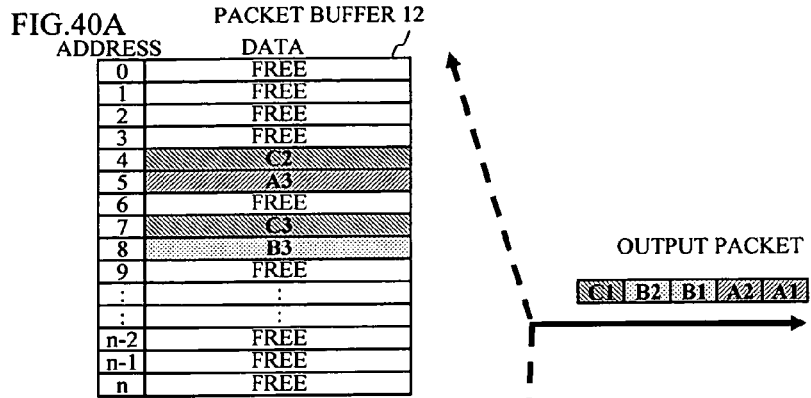

OUTPUT PACKET
C1 B2 B1 A2 A1

FIG.40B FREE ADDRESS MANAGING MEMORY

| ADDRESS | DATA | 141 |
|---|---|---|
| 0 | 0 (AVAILABLE) | |
| 1 | 3 (AVAILABLE) | |
| 2 | 1 (AVAILABLE) | |
| 3 | 6 (AVAILABLE) | |
| 4 | 2 (AVAILABLE) | |
| 5 | 5 (UNAVAILABLE) | <= WAC WRITE ADDRESS COUNT |
| 6 | 6 (UNAVAILABLE) | |
| 7 | 7 (UNAVAILABLE) | |
| 8 | 8 (UNAVAILABLE) | |
| READ ADDRESS COUNT RAC => 9 | 9 (AVAILABLE) | |
| : | : | |
| n-2 | n-2 (AVAILABLE) | |
| n-1 | n-1 (AVAILABLE) | |
| n | n (AVAILABLE) | |

FIG.40C ADDRESS CHAIN MANAGING MEMORY

| ADDRESS | DATA | 142 |
|---|---|---|
| 0 | CHAINED NEXT ADDRESS = 3 | |
| 1 | CHAINED NEXT ADDRESS = 6 | |
| 2 | CHAINED NEXT ADDRESS = 4 | |
| 3 | CHAINED NEXT ADDRESS = 5 | |
| 4 | CHAINED NEXT ADDRESS = 7 | |
| 5 | CHAINED NEXT ADDRESS = NONE | |
| 6 | CHAINED NEXT ADDRESS = 8 | |
| 7 | CHAINED NEXT ADDRESS = NONE | |
| 8 | CHAINED NEXT ADDRESS = NONE | |
| 9 | : | |
| : | : | |
| n-2 | : | |
| n-1 | : | |
| n | : | |

FIG.40D HEAD ADDRESS MANAGING MEMORY

| DESTINATION | DATA | 143 |
|---|---|---|
| A | HEAD ADDRESS = 5 | |
| B | HEAD ADDRESS = 8 | |
| C | HEAD ADDRESS = 4 | |
| : | : | |

FIG.40E TAIL ADDRESS MANAGING MEMORY

| DESTINATION | DATA | 144 |
|---|---|---|
| A | TAIL ADDRESS = 5 | |
| B | TAIL ADDRESS = 8 | |
| C | TAIL ADDRESS = 7 | |
| : | : | |

PRIOR ART

FIG.41A PACKET BUFFER 12

| ADDRESS | DATA |
|---|---|
| 0 | FREE |
| 1 | FREE |
| 2 | FREE |
| 3 | FREE |
| 4 | FREE |
| 5 | A3 |
| 6 | FREE |
| 7 | C3 |
| 8 | B3 |
| 9 | FREE |
| : | : |
| n-2 | FREE |
| n-1 | FREE |
| n | FREE |

OUTPUT PACKET

C2 C1 B2 B1 A2 A1

FIG.41B FREE ADDRESS MANAGING MEMORY 141

| ADDRESS | DATA |
|---|---|
| 0 | 0 (AVAILABLE) |
| 1 | 3 (AVAILABLE) |
| 2 | 1 (AVAILABLE) |
| 3 | 6 (AVAILABLE) |
| 4 | 2 (AVAILABLE) |
| 5 | 4 (AVAILABLE) |
| 6 | 6 (UNAVAILABLE) |
| 7 | 7 (UNAVAILABLE) |
| 8 | 8 (UNAVAILABLE) |
| 9 | 9 (AVAILABLE) |
| : | : |
| n-2 | n-2 (AVAILABLE) |
| n-1 | n-1 (AVAILABLE) |
| n | n (AVAILABLE) |

<= WAC WRITE ADDRESS COUNT

READ ADDRESS COUNT RAC =>

FIG.41C ADDRESS CHAIN MANAGING MEMORY 142

| ADDRESS | DATA |
|---|---|
| 0 | CHAINED NEXT ADDRESS = 3 |
| 1 | CHAINED NEXT ADDRESS = 6 |
| 2 | CHAINED NEXT ADDRESS = 4 |
| 3 | CHAINED NEXT ADDRESS = 5 |
| 4 | CHAINED NEXT ADDRESS = 7 |
| 5 | CHAINED NEXT ADDRESS = NONE |
| 6 | CHAINED NEXT ADDRESS = 8 |
| 7 | CHAINED NEXT ADDRESS = NONE |
| 8 | CHAINED NEXT ADDRESS = NONE |
| 9 | : |
| : | : |
| n-2 | : |
| n-1 | : |
| n | : |

FIG.41D HEAD ADDRESS MANAGING 143

| DESTINATION | DATA |
|---|---|
| A | HEAD ADDRESS = 5 |
| B | HEAD ADDRESS = 8 |
| C | HEAD ADDRESS = 7 |
| : | : |
| : | : |
| : | : |
| : | : |

FIG.41E TAIL ADDRESS MANAGING MEMORY 144

| DESTINATION | DATA |
|---|---|
| A | TAIL ADDRESS = 5 |
| B | TAIL ADDRESS = 8 |
| C | TAIL ADDRESS = 7 |
| : | : |
| : | : |
| : | : |

PACKET TRANSMISSION METHOD AND DEVICE

CROSS-REFERENCE TO RELATED APPLICATIONS

This application is related to and claims priority to Japanese Patent Application No. 2007-183532, filed on Jul. 12, 2007, in the Japan Patent Office, and incorporated by reference.

BACKGROUND

1. Field

The present invention relates to a packet transmission method and device, an in particular to a packet transmission (transfer) method and device for reading a packet such as an Ethernet (trademark) frame from a packet buffer having temporarily stored the packet for each destination in a scheduling control in the field of art providing a function such as QoS (Quality of Service) control, priority control, bandwidth control, etc. in an layer 2 (L2) switch device used in an IP network.

2. Description of the Related Art

In a prior art device for switching a packet between networks or within a network, a scheduler (scheduling portion), an input FIFO and output FIFO have been employed to achieve a QoS control, priority control, or bandwidth control etc. This will be described referring to FIGS. 20-41 as follows:

Overall Arrangement of Packet Transmission Device: FIG. 20

As shown in FIG. 20, a packet transmission device 1 is generally composed of LIU (Line Interface Unit) cards 2#1-2#4 ... (hereinafter, represented by reference numeral 2) and a switch (SW) card 3.

In this arrangement, packets coming from a network NW1 are received at physical ports P#0-P#n (hereinafter, a represented by a reference character P) of e.g. the LIU cards 2#1, 2#2 as shown by dotted routes R1, R2, and multiplexed respectively within the LIU cards 2#1, 2#2 to be provided to the switch card 3.

The switch card 3 identifies or discriminates the destination (output physical port) of each packet, and multiplies the packets and outputs them to e.g. the LIU card 2#3 where the corresponding physical port P exists. The LIU card 2#3 having received the packets from the switch card 3 performs a scheduling control and an output control, and outputs the packets to the network NW2 from the physical port P.

Conventional Arrangement of LIU Card: FIGS. 21-23

A conventional arrangement of the LIU card 2 is shown in FIG. 21 in which each block shown has the following functions:

(a) Write controller 11: Notifying, upon receiving a packet, received packet information (destination physical port number, packet length, etc.) to an address manager 14, and performing a write control of the packet in an address of a packet buffer 12 indicated by a free or vacant address from the address manager 14;

(b) Packet buffer 12: Storing an actual packet and outputting the packet in accordance with the scheduling control;

(c) Read controller 13: Performing, upon transmitting a packet, a read control of a packet from an address of the packet buffer 12 indicated by a read address from the address manager 14;

(d) Address manager 14: Controlling the following memories 141-144 with an address controller 140 to issue a write address and a read address:

Free address managing memory 141: Storing an available address;

Address chain managing memory 142: Managing connection of the order of packets stored in the packet buffer 12 and connection of data within the packets for each destination in the form of chain of address values (hereinafter, occasionally simplified as address);

Head address managing memory 143: Storing an address value in which a head packet for each destination physical port exists;

Tail address managing memory 144: Storing an address value in which a tail (final) packet for each destination physical port exists;

(e) Scheduler 15: Performing a scheduling control for selecting a destination (physical port) to be read by e.g. a round robin method while performing a bandwidth control by monitoring a contract bandwidth of a customer;

(f) Packet controller 16: Comprising the following three portions:

Destination discriminator 161: Discriminating or identifying a destination physical port number, determining which of packet FIFOs 162 should be used for the storage for each destination, and performing a write control;

Packet FIFO 162: Storing actual packets for each of the physical ports P#0-P#n;

Arbiter 163: Selecting the packet FIFO 162 to be read, performing a read control, and stopping reading packets for each physical port with a back pressure signal BP;

(g) Output portion 17: Comprising a demultiplexing (Dmux) portion 17 and "n" number of physical ports (P#0-P#n) 172, in which the Dmux portion 171 performs arranging transmission packets and generating the back pressure signal BP.

FIG. 22A shows a composition or format of the packet buffer 12, FIGS. 22B-22E show compositions of the memories 141-144, and FIG. 22F shows a composition of the packet FIFO 162, where the memories 143 and 144 store an address value for each physical port, and the packet FIFO 162 stores a packet for each physical port. The packet FIFO 162 shown has a memory composition for a single physical port.

Also, FIG. 23 shows a general composition of a packet.

Packet Receiving Operation: FIGS. 24 and 25

An operation of the LIU card 2 shown in FIG. 21 at the time of packet reception will now be described along flows indicated by reference numerals (1)-(4) shown in FIGS. 24 and 25, where in this receiving operation, only a read address counter value RAC of the memory 141 is incremented by only one address for one packet input but a write address counter value WAC does not run:

First, an operation (i) at the time of receiving the first packet for a certain destination will be described referring to FIG. 24 as follows:

(1) At the time of receiving a packet, the write controller 11 notifies received packet information (destination physical port number, packet length, etc.) to the address controller 140, which acquires a free address from the address managing memory 141;

(2) The address controller 140 writes a free address value acquired in the above (1) in an address of the corresponding physical port number (P#0-P#n) in the head address managing memory 143 (update of the head address value), and also writes a free address value in an address of the corresponding physical port number in the tail address managing memory 144 as well (update of the tail address value);
(3) The address controller 140 notifies received packet information for read controls to the scheduler 15;
(4) Address controller 140 outputs the free address value acquired in the above (1) to the write controller 11, which stores the received packet in an address of the packet buffer 12 indicated by the free address value.

Next, an operation (ii) at the time of receiving a packet toward a physical port having the same destination will be described along flows indicated by reference numerals (1)-(5) referring to FIG. 25 as follows:
(1) At the time of receiving a packet, the write controller 11 notifies received packet information (destination physical port number, packet length, etc.) to the address controller 140, which acquires a free address value from the free address managing memory 141;
(2) The address controller 140 writes the free address value acquired in the above (1) in an address of the corresponding physical port number in the tail address managing memory 144 (update of tail address value);
(3) The address controller 140 reads the head address value of the corresponding physical port number from the head address managing memory 143, and writes the free address value acquired in the above (1) in an address area indicated by the head address value in the address chain managing memory 142 (chaining operation of address value);
(4) The address controller 140 notifies the received packet information for read controls to the scheduler 15;
(5) The address controller 140 outputs the free address value acquired in the above (1) to the write controller 11, which stores the received packet in an address of the packet buffer 12 indicated by the free address value.

Transition of Memory Contents: FIGS. 26A-26E to 33A-33E

The above receiving operations will now be described more specifically referring to FIGS. 26-33 showing contents of the memories 141-144 as follows:
1) Default state (before packet input): FIGS. 26A-26E
  The memory contents at this initial setting are as follows:
   Packet buffer 12: All addresses=free;
   Free address managing memory 141: All addresses=available;
   Address chain managing memory 142:
     All addresses=no chained next address;
   Head address managing memory 143:
     All addresses=no head address;
   Tail address managing memory 144:
     All addresses=no tail address.
2) Input of packets A1, B1, C1: FIGS. 27A-27E
  When having sequentially received three packets A1, B1, C1 respectively of destinations (physical ports) A, B, C, the memory contents are as follows:
   Packet buffer 12:
     Packets A1, B1, C1 are respectively stored in addresses 0, 1, 2;
   Free address managing memory 141:
     Data of addresses 0, 1, 2 are unavailable;
   Address chain managing memory 142: Unchanged;
   Head address managing memory 143:
     Head address of destination A=0,
     Head address of destination B=1,
     Head address of destination C=2;
   Tail address managing memory 144:
     Tail address of destination A=0,
     Tail address of destination B=1,
     Tail address of destination C=2.

3) Input of packet A2: FIGS. 28A-28E
  When having received the second packet A2 having the destination A, the memory contents are as follows:
   Packet buffer 12: Packet is stored in address 3;
   Free address managing memory 141:
     Data of address 3 is unavailable;
   Managing memory 142:
     Chained next address of address 0=3;
   Head address managing memory 143: Unchanged;
   Tail address managing memory 144:
     Tail address of destination A=0→3 (changed from 0 to 3).
4) Input of packet C: FIGS. 29A-29E
  When having received the second packet C2 of the destination C, the memory contents are as follows:
   Packet buffer 12: Packet is stored in address 4;
   Free address managing memory 141:
     Data of address 4 is unavailable;
   Address chain managing memory 142:
     Chained next address of address 2=4;
   Head address managing memory 143: Unchanged;
   Tail address managing memory 144:
     Tail address of destination C=2→4
5) Input of packet A3: FIGS. 30A-30E
  When having received the third packet A3 of the destination A, the memory contents are as follows:
   Packet buffer 12: Packet is stored in address 5;
   Free address managing memory 141:
     Data of address 5 is unavailable;
   Address chain managing memory 142:
     Chained next address of address 3=5;
   Head address managing memory 143: Unchanged;
   Tail address managing memory 144:
     Tail address of destination A=3→5.
6) Input of packet B2: FIGS. 31A-31E
  When having received the second packet B2 of the destination B, the memory contents are as follows:
   Packet buffer 12: Packet is stored in address 6;
   Free address managing memory 141:
     Data of address 6 is unavailable;
   Address chain managing memory 142:
     Chained next address of address 1=6;
   Head address managing memory 143: Unchanged;
   Tail address managing memory 144:
     Tail address of destination B=1→6.
7) Input of packet C3: FIGS. 32A-32E
  When having received the third packet C3 of the destination C, the memory contents are as follows:
   Packet buffer 12: Packet is stored in address 7;
   Free address managing memory 141:
     Data of address 7 is unavailable;
   Address chain managing memory 142:
     Chained next address of address 4=7;
   Head address managing memory 143: Unchanged;
   Tail address managing memory 144:
     Tail address of destination C=4→7.
8) Input of packet B3: FIGS. 33A-33E
  When having received the third packet B3 of the destination B, the memory contents are as follows:
   Packet buffer 12: Packet is stored in address 8;
   Free address managing memory 141:
     Data of address 8 is unavailable;
   Address chain managing memory 142:
     Chained next address of address 6=8;
   Head address managing memory 143: Unchanged;
   Tail address managing memory 144:
     Tail address of destination B=6→8.

Packet Transmitting Operation: FIGS. 34 and 35A, 35B

Next, an operation of the LIU card 2 shown in FIG. 21 at the time of transmitting packets will be described along flows indicated by reference numeral (1)-(5) referring to FIGS. 34 and 35, where the read address counter value RAC of the memory 141 does not run but only the write address counter value WAC is incremented by one every time one packet is outputted:

(1) The address controller 140 having received a read physical port number determined by the scheduling control in the scheduler 15 reads a destination corresponding to the physical port number from the head address managing memory 143;

(2) The address controller 140 reads a chained next address value from the address chain managing memory 142 with the head address value acquired in the above (1), and writes the chained next address value in the address of the corresponding physical port number in the head address managing memory 143 (update of head address value);

(3) The address controller 140 returns the head address value acquired in the above (1) to the free address managing memory 141;

(4) The read controller 13 reads a packet from the packet buffer 12 with the head address value acquired in the above (1), and a destination discriminator 161 of the packet controller 16 discriminates the destination physical port number to be accumulated in the packet FIFO 162 of the corresponding physical port;

(5) The packets accumulated in the packet FIFO 162 are read therefrom at a read request from the arbiter 163 (e.g. a simple round robin operation) and outputted from the corresponding physical port 172 through the Dmux portion 171 of the output portion 17, where the Dmux portion 171 performs an output control in accordance with the actual rate, in which the outputting is stopped at the occurrence of a state exceeding the actual rate due to a burst or the like and the back pressure signal BP is transmitted to the arbiter 163, which controls the destination discriminator 161 to stop packet reading from the packet FIFO 162 of the corresponding physical port.

Specifically describing the above referring to FIGS. 35A and 35B, under contract of 1 Gbps on a physical basis for the output port, packets read from the packet buffer 12 beyond 1 Gbps in a burst mode can not be outputted, so that the back pressure signal BP is outputted from the Dmux portion 171 to the packet controller 16 to stop the packet outputting. When the packet outputting is stopped, the packets read from the packet buffer are accumulated in the packet FIFO 162 up to a level where any further packets can not be accumulated, at which the back pressure signal BP is outputted from the destination discriminator 161 of the packet controller 16 to the scheduler 15 to stop reading the packets from the packet buffer 12.

This keeps the rate of 1 Gbps in average as shown in FIG. 35B. It is to be noted that the issuance of read addresses to the packet buffer 12 is performed while the scheduler 15 is monitoring the contract bandwidth of the customer, as shown in FIG. 35A.

Transition of Memory Contents: FIGS. 36A-36E to 41A-41E

The above transmitting operation will be now described more specifically referring to FIGS. 36-41 showing contents of the memories 141-144, where the memory contents at the start of transmission are supposed to have the contents shown in FIG. 33:

1) Output of packet A1: FIGS. 36A-36E
When outputting the first packet A1 of the destination A based on the instructions of the scheduler 15, the memory contents are as follows:
Packet buffer 12: Address 0=free;
Free address managing memory 141:
Data of address 0 is available;
Address chain managing memory 142: Unchanged;
Head address managing memory 143:
Head address of destination A=0→3;
Tail address managing memory 144: Unchanged.

2) Output of packet A2: FIGS. 37A-37E
When outputting the second packet A2 of the destination A, the memory contents are as follows:
Packet buffer 12: Address 3=free;
Free address managing memory 141:
Data of address 3 is available;
Address chain managing memory 142: Unchanged;
Head address managing memory 143:
Head address of destination A=3→5;
Tail address managing memory 144: Unchanged.

2) Output of packet B1: FIGS. 38A-38E
When outputting the first packet B1 of the destination B, the memory contents are as follows:
Packet buffer 12: Address 1=free;
Free address managing memory 141:
Data of address 1 is available;
Address chain managing memory 142: Unchanged;
Head address managing memory 143:
Head address of destination B=1→6;
Tail address managing memory 144: Unchanged.

4) Output of packet B2: FIGS. 39A-39E
When outputting the second packet B2 of the destination B, the memory contents are as follows:
Packet buffer 12: Address 6=free;
Free address managing memory 141:
Data of address 6 is available;
Address chain managing memory 142: Unchanged;
Head address managing memory 143:
Head address of destination B=6→8;
Tail address managing memory 144: Unchanged.

5) Output of packet C1: FIGS. 40A-40E
When outputting the first packet C1 of the destination C, memory contents are as follows:
Packet buffer 12: Address 2=free;
Free address managing memory 141:
Data of address 2 is available;
Address chain managing memory 142: Unchanged;
Head address managing memory 143:
Head address of destination C=2→4;
Tail address managing memory 144: Unchanged.

6) Output of packet C2: FIGS. 41A-41E
When outputting the second packet C2 of the destination C, the memory contents are as follows:
Packet buffer 12: Address 4=free;
Free address managing memory 141:
Data of address 4 is available;
Address chain managing memory 142: Unchanged;
Head address managing memory 143:
Head address of destination C=4→7;
Tail address managing memory 144: Unchanged.

It is to be noted that for a reference document, there has been proposed a packet exchanging device and method in which an input buffer portion corresponding to an input line transmits the data assembled by forming a block with packets sequentially having a higher priority for the same output path destination; a scheduler performs a competitive arbitration for the data transmitted and an N×N switch portion switches over the connection of the data to the output line based on the competitive arbitration (see e.g. Patent document 1).

Also, there has been proposed an ATM cell multiplexing method and device in which a single cell buffer is used to manage the storage of the cell buffer with pointer values, the cell buffer is accumulated with ATM cells mixed with different quality classes, and reading from the cell buffer per quality class is made based on the pointer values of the cell buffer stored in a class buffer (FIFO) provided per quality class for a pointer buffer (see e.g. Patent document 2).

Furthermore, there has been proposed a switch and switching method in which a controller included in NIU extracts destination information included in the received data to determine a destination line by associating the destination information and transfer information based on a table; then the received data is transferred to a buffer area through a bus and is temporarily stored in the buffer area; then the controller writes in a queue together with a pointer indicating the address of the data in the buffer area to the effect that the data to be transmitted exists in the buffer area; NIU properly checks the status of the queue and reads the data to be transmitted from the buffer area at a suitable timing based on the pointer in the presence of the data and transmits it to the line (see e.g. Patent document 3).

[Patent document 1]
  Japanese patent application laid-open No. 2001-298477
[Patent document 2]
  Japanese patent application laid-open No. 2000-78139
[Patent document 3]
  Japanese patent application laid-open No. 10-327175

As described above, in the LIU card of the prior art packet transmission device as shown in FIG. 21, packets inputted from the physical ports are once saved or accumulated in the packet buffer, and then transmitted under the control of the scheduler in accordance with a priority class of the packets and transmission rates of the output physical ports.

In this case, the scheduler can not perform a rate control in response to a burst output, so that the packet controller is required to have a packet FIFO by physical port. This enables the packet transmission to be monitored in conformity with the actual rate, where at the occurrence of an abnormal transmission rate due to a burst or the like the packet transmission is stopped while notifying the back pressure signal to the scheduler, thereby stopping the scheduling control for the corresponding physical port.

Meanwhile, a device processing a large quantity of data has been recently required as the number of subscriber increases. Therefore, in case a packet FIFO is provided by physical port as described above, it has been disadvantageous that a time delay of data processing due to packets remaining in the packet FIFO, incurring an increased power consumption and heat generation due to increase of a circuit scale because of the free address managing memory and the address chain managing memory being separately used, as well as an increased heat generation due to downsizing.

SUMMARY

It is accordingly an object of the present invention to provide a packet transmission method and device, for solving the above problem, which can suppress a power consumption and a heat generation of the device due to reduction of circuit scale by excluding a packet processing delay and simplifying the circuit arrangement.

In order to achieve the above-mentioned object, a packet transmission method according to one aspect of an embodiment comprises: a first step of storing, when a received packet is written in a packet buffer, an address of the packet buffer as a read address for each destination corresponding to a physical port and storing information of the received packet, a second step of reading and saving the read address of a destination designated by the received packet information when the received packet is read out of the packet buffer in accordance with a scheduling control, and a third step of taking out the saved read address in accordance with an arbitration control and reading a received packet corresponding to the saved read address from the packet buffer.

Namely, in this embodiment, when a received packet having been written in a packet buffer is read in accordance with a scheduling control, an address (address value) stored at the write time, i.e. a read address is read and saved for each destination (physical port) designated by received packet information.

Then, at an arbitration control time, the received packet corresponding to the read address saved is read from the packet buffer.

Accordingly, without using FIFO or the like storing packets at the latter stage of the packet buffer, a packet transmission can be performed by address, thereby preventing a processing time delay.

In the above packet transmission method, the address of the packet buffer may be managed for each destination in form of a chain of free address and an address chain of an order of the received packet, the order address chain (address chain of order) may be written as the read address in the free address chain (chain of free address) when writing the received packet in the packet buffer, and the free address chain may be written in the order address chain of the received packet having been written when reading the packet from the packet buffer.

In the above packet transmission method, the order address chain may be composed of a head address, a tail address, and a chain address connecting the head address to the tail address for each destination, and the free address chain may be composed of a free head address at a time when a first received packet is written in the packet buffer, a free next address subsequent to the free head address, and a free tail address indicating a free address of the packet buffer at a time when the received packet is read.

In order to solve the above problem, a packet transmission device according to one aspect of an embodiment comprises: a first portion storing, when a received packet is written in a packet buffer, an address of the packet buffer as a read address for each destination corresponding to a physical port and storing information of the received packet, a second portion reading and saving the read address of a destination designated by the received packet information when the received packet is read out of the packet buffer in accordance with a scheduling control, and a third portion taking out the saved read address in accordance with an arbitration control and reading a received packet corresponding to the saved read address from the packet buffer.

In the above packet transmission device, the address of the packet buffer may be managed for each destination in form of a chain of free address and an address chain of an order of the received packet, the order address chain may be written as the read address in the free address chain when writing the received packet in the packet buffer, and the free address chain may be written in the order address chain of the received packet having been written when reading the packet from the packet buffer.

In the above packet transmission device, the order address chain may be composed of a head address, a tail address, and a chain address connecting the head address to the tail address for each destination, and the free address chain may be composed of a free head address at a time when a first received packet is written in the packet buffer, a free next address subsequent to the free head address, and a free tail address indicating a free address of the packet buffer at a time when the received packet is read.

The above packet transmission method or device may further comprise a fourth step of (portion) generating a back pressure signal forming scheduling stop instructions by monitoring an accumulated quantity of the packet buffer for each physical port to control a read bandwidth from the packet buffer.

In this embodiment, without using a FIFO storing packets at the latter stage of the packet buffer, a real transmission rate adjustment for each port can be performed with a small-scale address FIFO or the like newly provided before reading a frame from the packet buffer, so that it becomes possible to make a significant scale reduction, down sizing, and power reduction.

Also, upon issuing or releasing addresses, and managing the address chain (connecting order) within a frame, a free address managing memory monitoring the issuance or release of addresses and an address chain managing memory managing the address chain within a frame can be integrated in the same shared managing memory, so that the storage capacity and power consumption can be reduced.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 2A-2E are diagrams showing compositions or formats of memories, FIFO, and a buffer in an LIU card of an embodiment of a packet transmission method and device;

FIGS. 5A-5D are diagrams each showing memory contents (i) at the time of receiving (initial) packets in an embodiment of a packet transmission method and device;

FIGS. 6A-6D are diagrams each showing memory contents (ii) at the time of receiving packets in an embodiment of a packet transmission method and device;

FIGS. 7A-7D are diagrams each showing memory contents (iii) at the time of receiving packets in an embodiment of a packet transmission method and device;

FIGS. 8A-8D are diagrams each showing memory contents (iv) at the time of receiving packets in an embodiment of a packet transmission method and device;

FIGS. 9A-9D are diagrams each showing memory contents (v) at the time of receiving packets in an embodiment of a packet transmission method and device;

FIGS. 10A-10D are diagrams each showing memory contents (vi) at the time of receiving packets in an embodiment of a packet transmission method and device;

FIGS. 11A-11D are diagrams each showing memory contents (vii) at the time of receiving packets in an embodiment of a packet transmission method and device;

FIGS. 12A-12D are diagrams each showing memory contents (viii) at the time of receiving packets in an embodiment of a packet transmission method and device;

FIGS. 14A-14D are diagrams each showing memory contents (i) at the time of transmitting (initial) packets in an embodiment of a packet transmission method and device;

FIGS. 15A-15D are diagrams each showing memory contents (ii) at the time of transmitting packets in an embodiment of a packet transmission method and device;

FIGS. 16A-16D are diagrams each showing memory contents (iii) at the time of transmitting packets in an embodiment of a packet transmission method and device;

FIGS. 17A-17D are diagrams each showing memory contents (iv) at the time of transmitting packets in an embodiment of a packet transmission method and device;

FIGS. 18A-18D are diagrams each showing memory contents (v) at the time of transmitting packets in an embodiment of a packet transmission method and device;

FIGS. 19A-19D are diagrams each showing memory contents (vi) at the time of transmitting packets in an embodiment of a packet transmission method and device;

FIGS. 22A-22F are diagrams showing compositions or formats of memories, FIFO, and buffer in the conventional in a prior art LIU card;

FIG. 23 is a diagram showing a general format of a packet;

FIGS. 26A-26E are diagrams each showing memory contents (i) at the time of receiving (initial) packets in a prior art LIU card;

FIGS. 27A-27E are diagrams each showing memory contents (ii) at the time of receiving packets in a prior art LIU card;

FIGS. 28A-28E are diagrams each showing memory contents (iii) at the time of receiving packets in a prior art LIU card;

FIGS. 29A-29E are diagrams each showing memory contents (iv) at the time of receiving packets in a prior art LIU card;

FIGS. 30A-30E are diagrams each showing memory contents (v) at the time of receiving packets in a prior art LIU card;

FIGS. 31A-31E are diagrams each showing memory contents (vi) at the time of receiving packets in a prior art LIU card;

FIGS. 32A-32E are diagrams each showing memory contents (vii) at the time of receiving packets in a prior art LIU card;

FIGS. 33A-33E are diagrams each showing memory contents (viii) at the time of receiving packets in a prior art LIU card;

FIGS. 36A-36E are diagrams each showing memory contents (i) at the time of transmitting packets in a prior art LIU card;

FIGS. 37A-37E are diagrams each showing memory contents (ii) at the time of transmitting packets in a prior art LIU card;

FIGS. 38A-38E are diagrams each showing memory contents (iii) at the time of transmitting packets in a prior art LIU card;

FIGS. 39A-39E are diagrams each showing memory contents (iv) at the time of transmitting packets in a prior art LIU card;

FIGS. 40A-40E are diagrams each showing memory contents (v) at the time of transmitting packets in a prior art LIU card; and FIGS. 41A-41E are diagrams each showing memory contents (vi) at the time of transmitting packets in a prior art LIU card.

DESCRIPTION OF THE EMBODIMENTS

Figure 1:
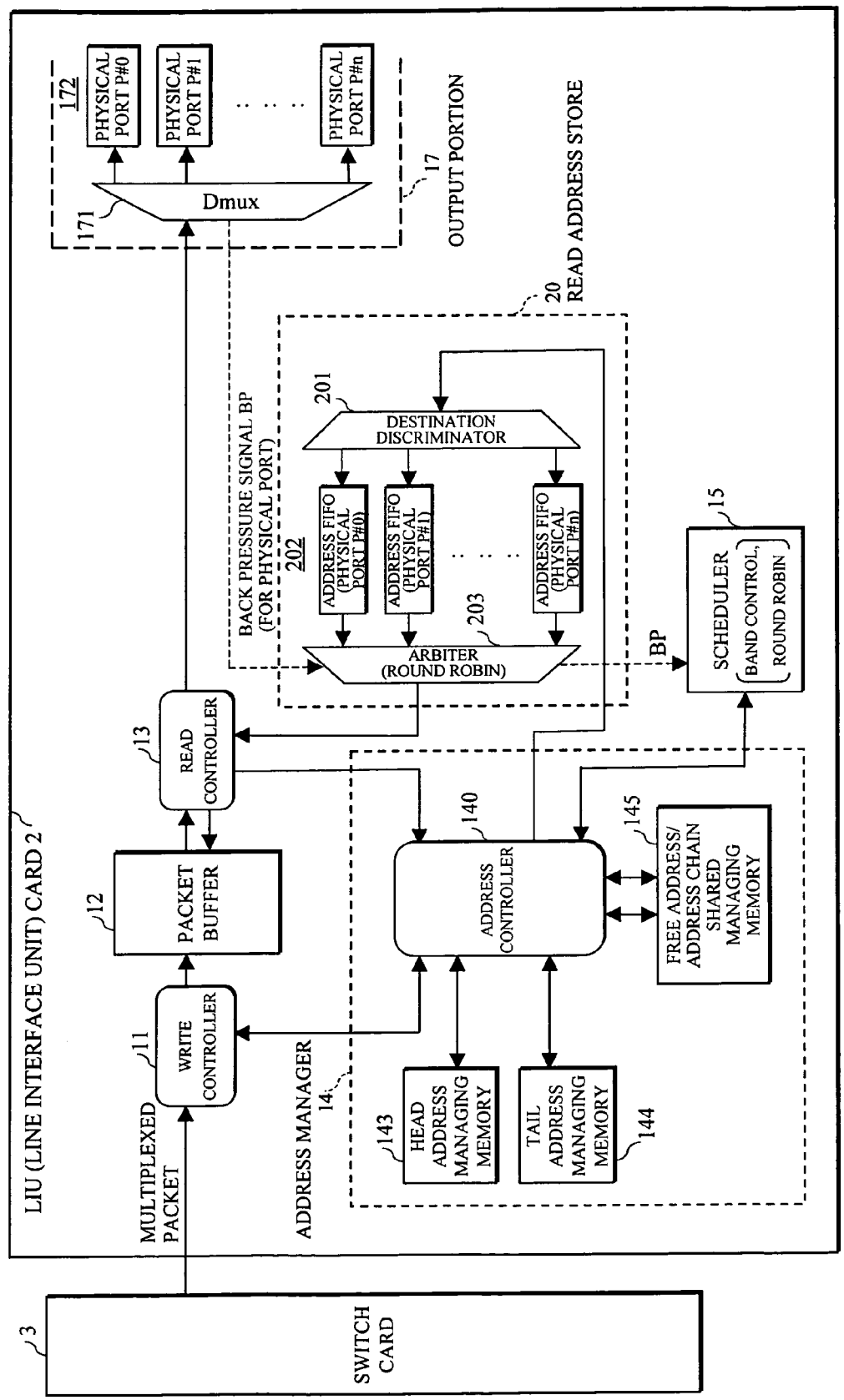
FIG. 1 is a block diagram showing an LIU card arrangement used in an embodiment of a packet transmission method and device.

Arrangement of LIU Card Embodiment: FIGS. 1 and 2

FIG. 1 shows an arrangement of an LIU card 2 used in an embodiment of a packet transmission method and device. This arrangement is adapted to make an actual transmission rate adjustment for each physical port with a newly provided small-scale address FIFO before reading a packets from a packet buffer, without using a packet FIFO by physical port used for an output rate control.

Figure 21:
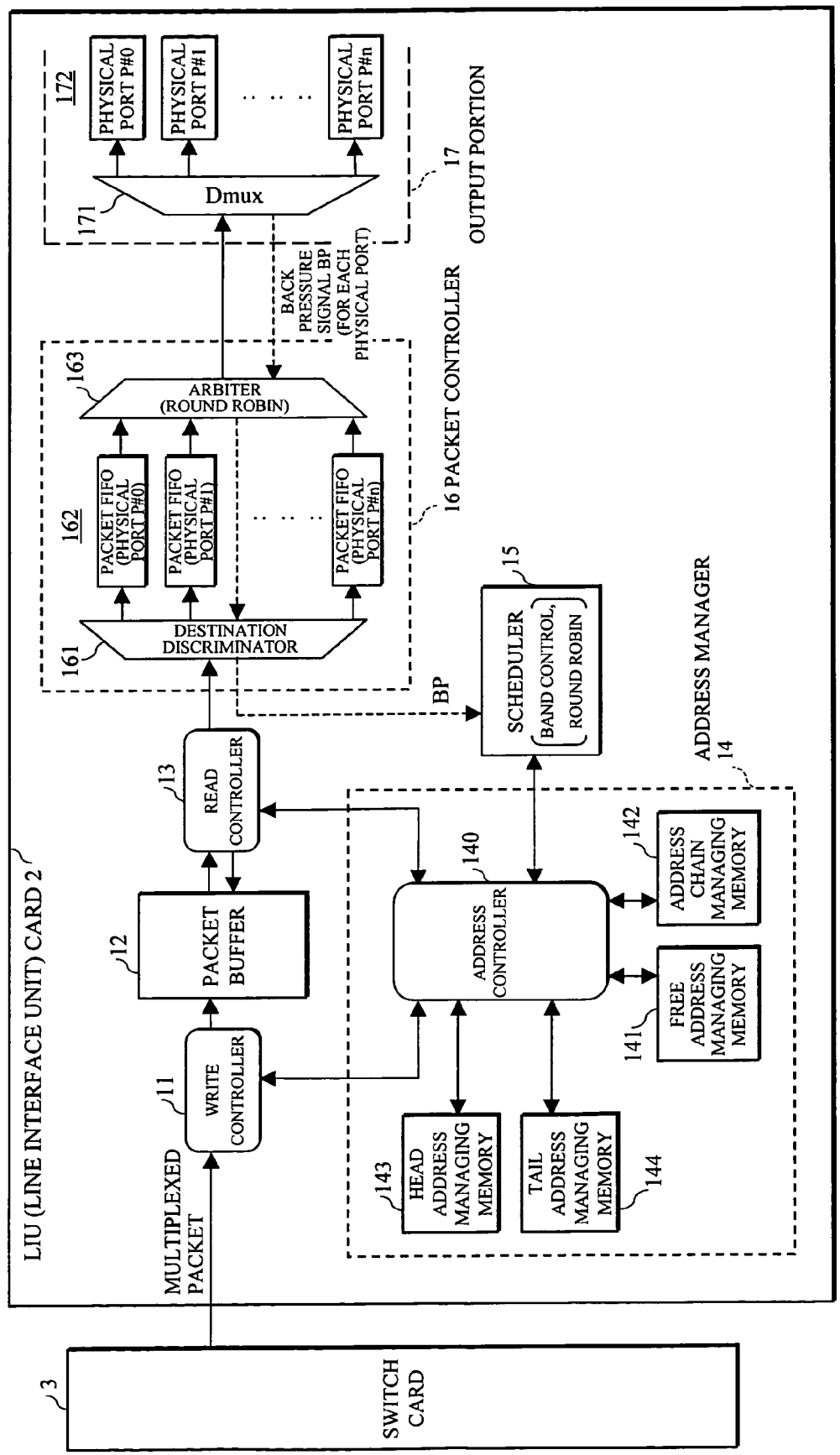
FIG. 21 is a block diagram showing an arrangement of a prior art LIU card used in a packet transmission device.
Figure 24:
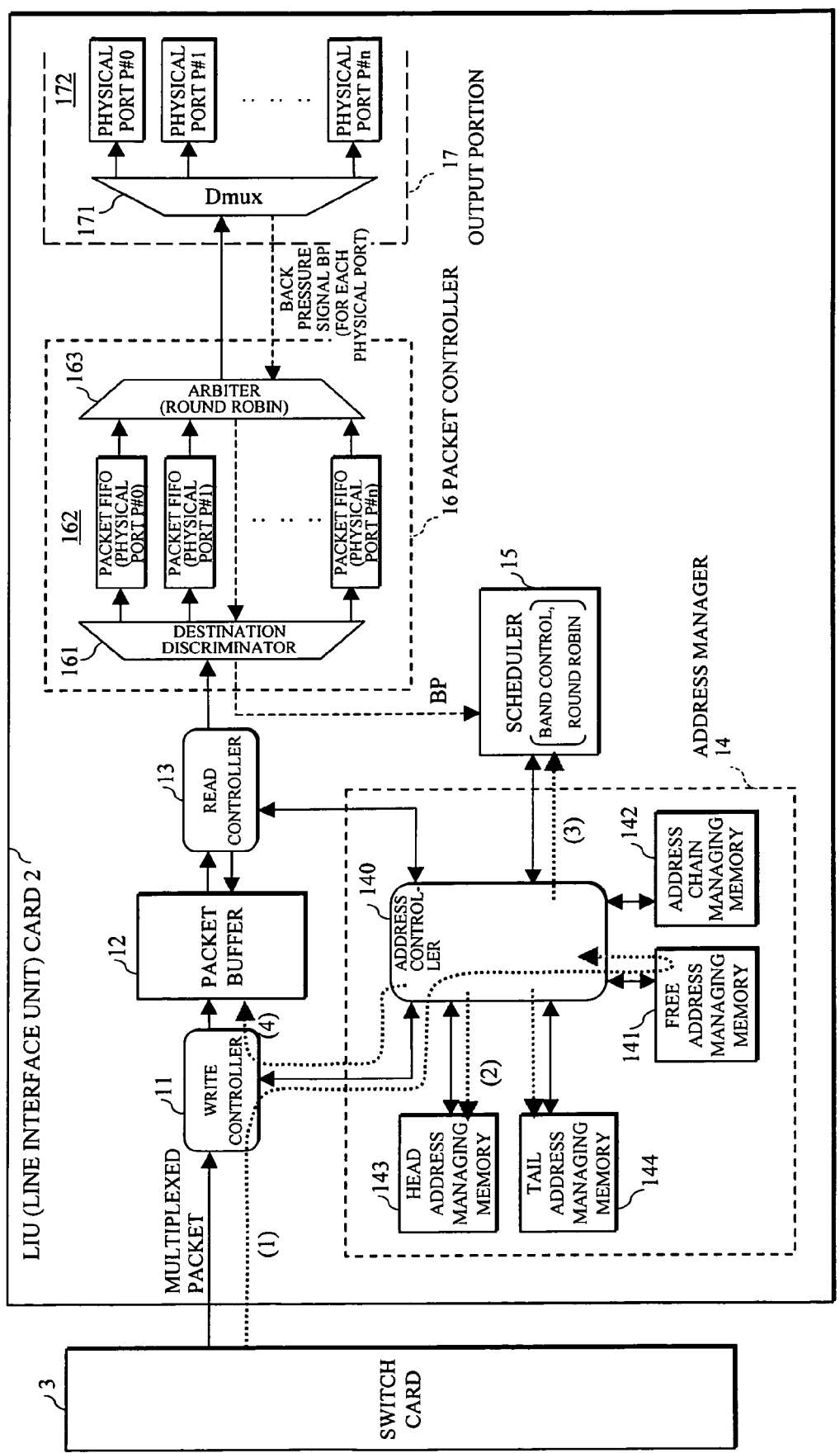
FIG. 24 is a block diagram showing a packet receiving sequence (i) in a prior art LIU card.
Figure 25:
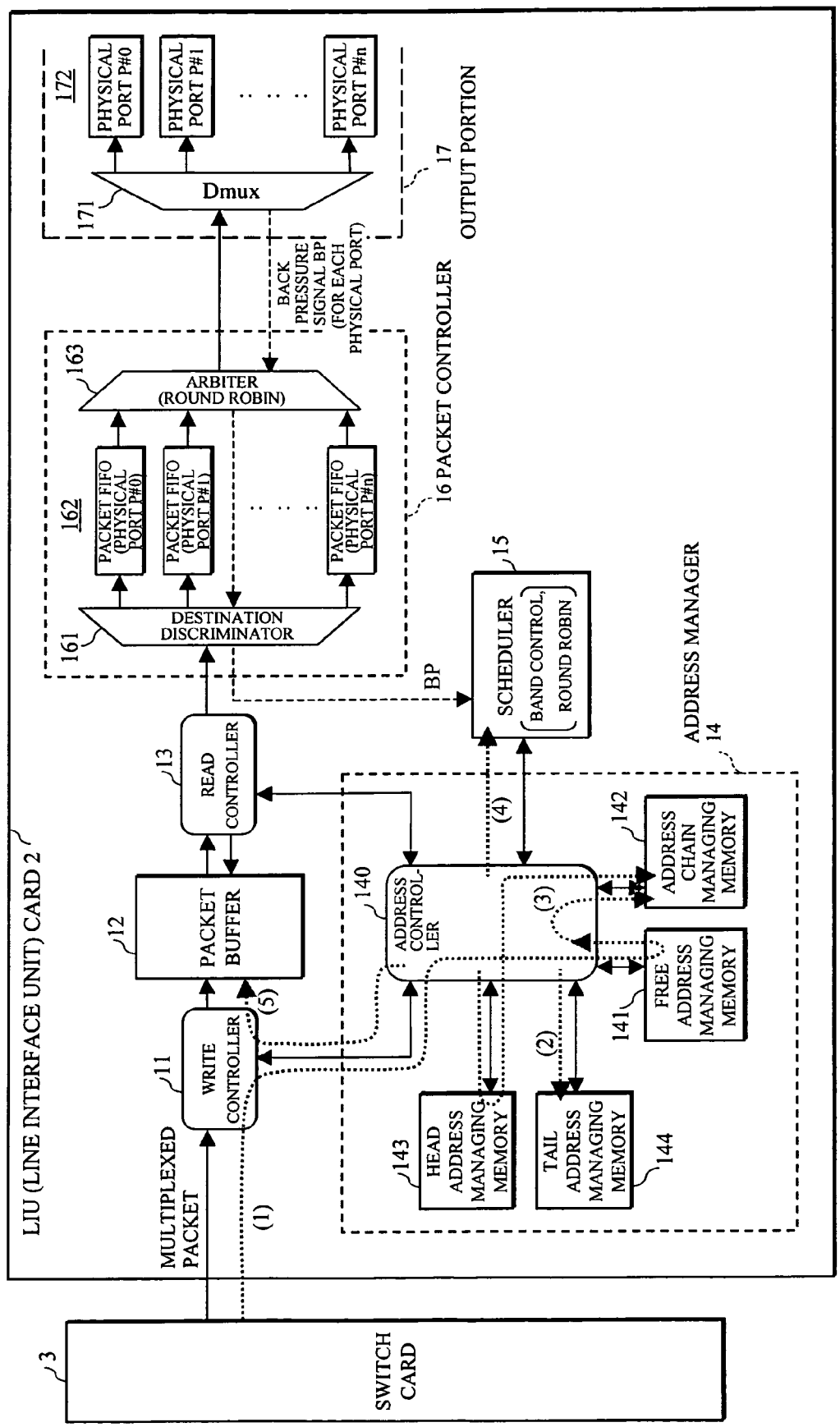
FIG. 25 is a block diagram showing a packet receiving sequence (ii) in a prior art LIU card.
Figure 34:
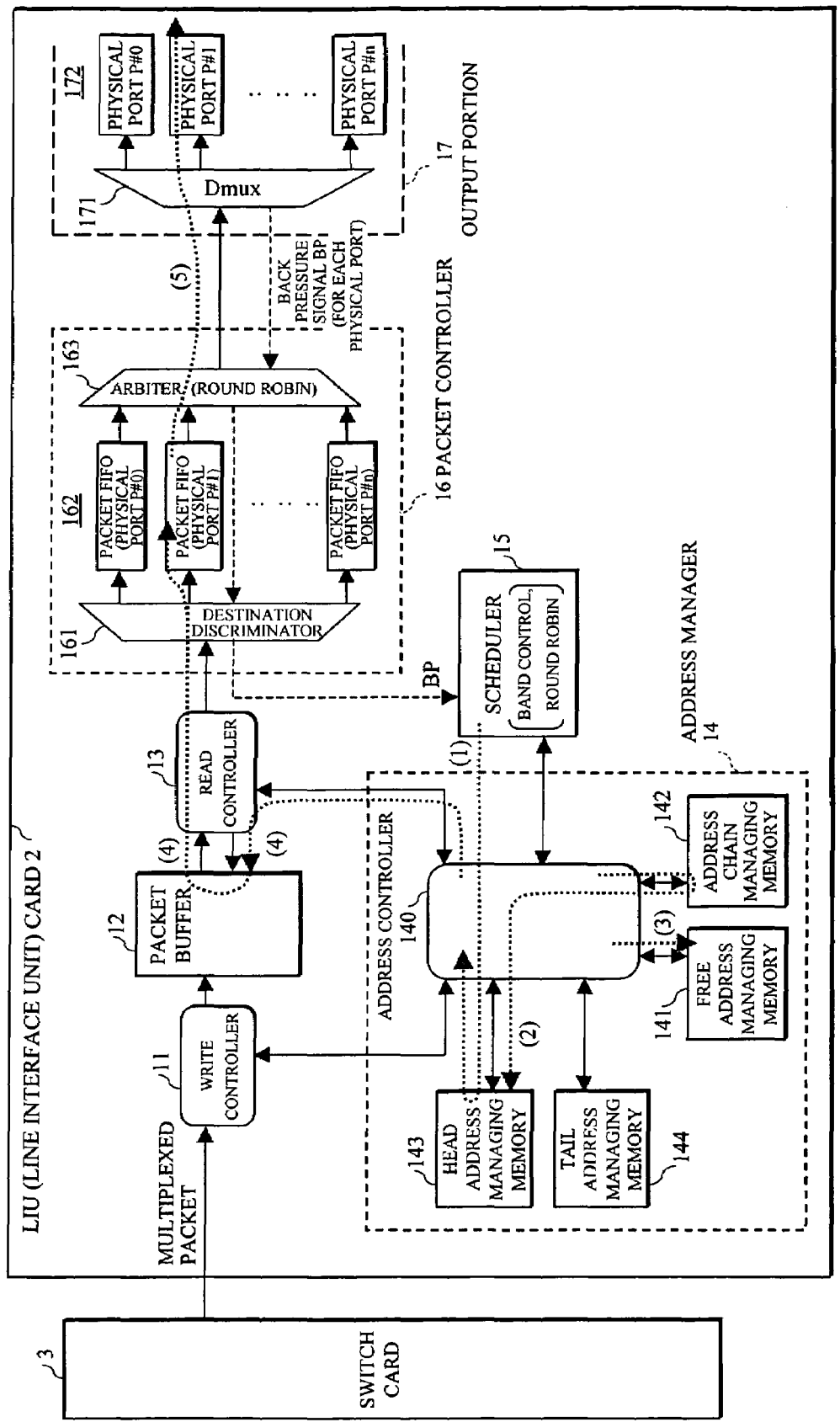
FIG. 34 is a block diagram showing a packet transmitting sequence (i) in a prior art LIU card.
Figure 35A:
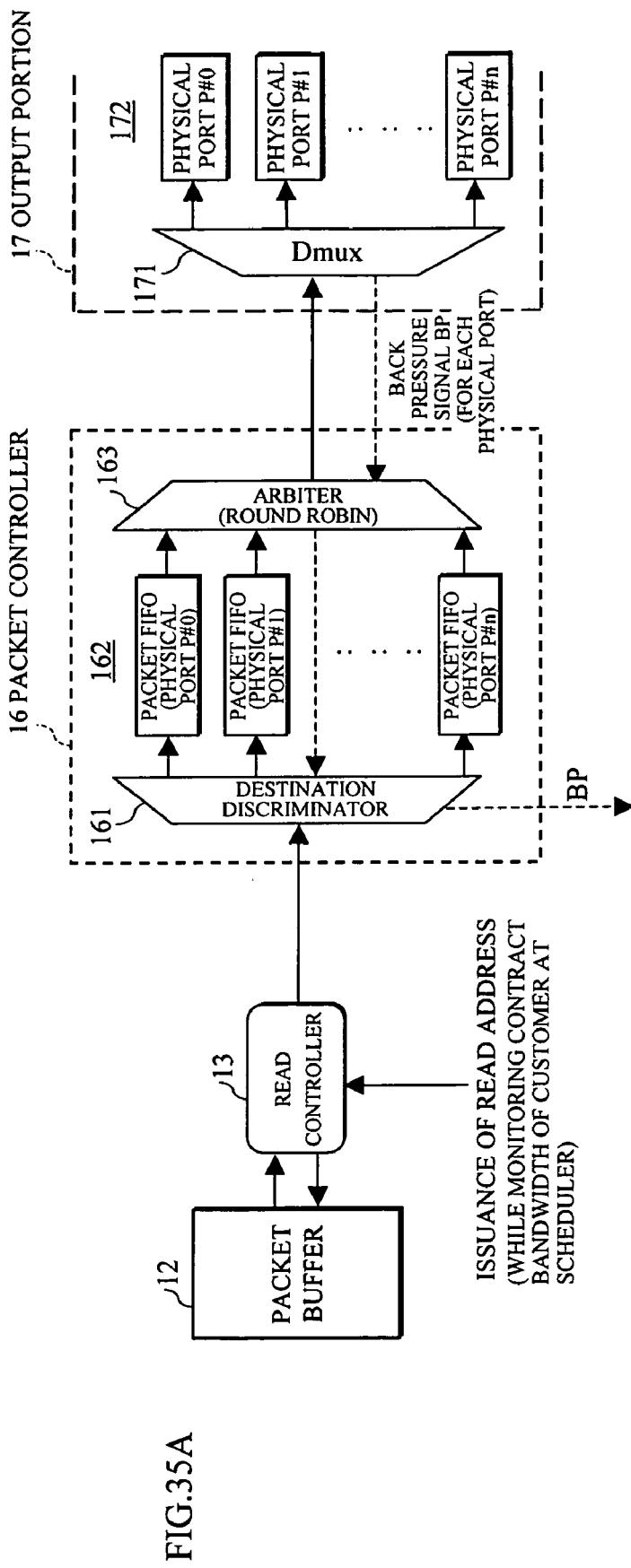
FIGS. 35A and 35B are diagrams for illustrating a transmitting bandwidth control of packets.
Figure 35B:
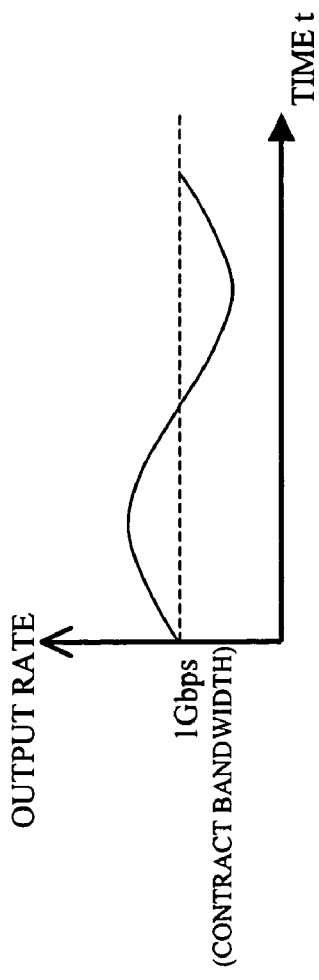

For this purpose, this embodiment is different from the prior art arrangement shown in FIG. 21 in that the read controller 13 is directly connected to the output portion 17, the packet controller is replaced by a read address store 20 which is connected between the address controller 140 and the read controller 13, and the address manager 14 uses a free address/address chain-shared managing memory 145 (hereinafter, occasionally referred to simply as a shared managing memory 145) having commoditized the free address managing memory and the address chain managing memory.

Different portions or functions are as follows:
(a) Free address/address chain shared managing memory 145: Managing for each destination a connection of free addresses in the packet buffer 12 and a connection of order of received packets, with a chain of address values;
(b) Read address store 20: Comprising the following three portions:
  Destination discriminator 201: Discriminating read physical port numbers determined by the scheduler 15 to select which of the address FIFO 202 should be used for the accumulation;
  Address FIFO 202: Storing a read address value of a packet read from the packet buffer 12 for each physical port;
  Arbiter 203: Selecting the address FIFO 202 to be read, and stopping reading the corresponding physical port with the back pressure signal BP.

FIG. 2A shows a composition or format of the packet buffer 12, FIG. 2B-2D respectively show a composition of the memories 143-145, and FIG. 2E shows a composition of the address FIFO 202. The memory 143 has one area for storing free area-head address values besides head address values destined for each physical port, the memory 144 has one area for storing free area-tail address values besides tail address values destined for each physical port, a newly provided memory 145 stores "chained next address" or "free next address", and the address FIFO 202 stores a read address for each physical port. In the example shown, the address FIFO 202 has a memory composition for a single physical port.

Figure 3:
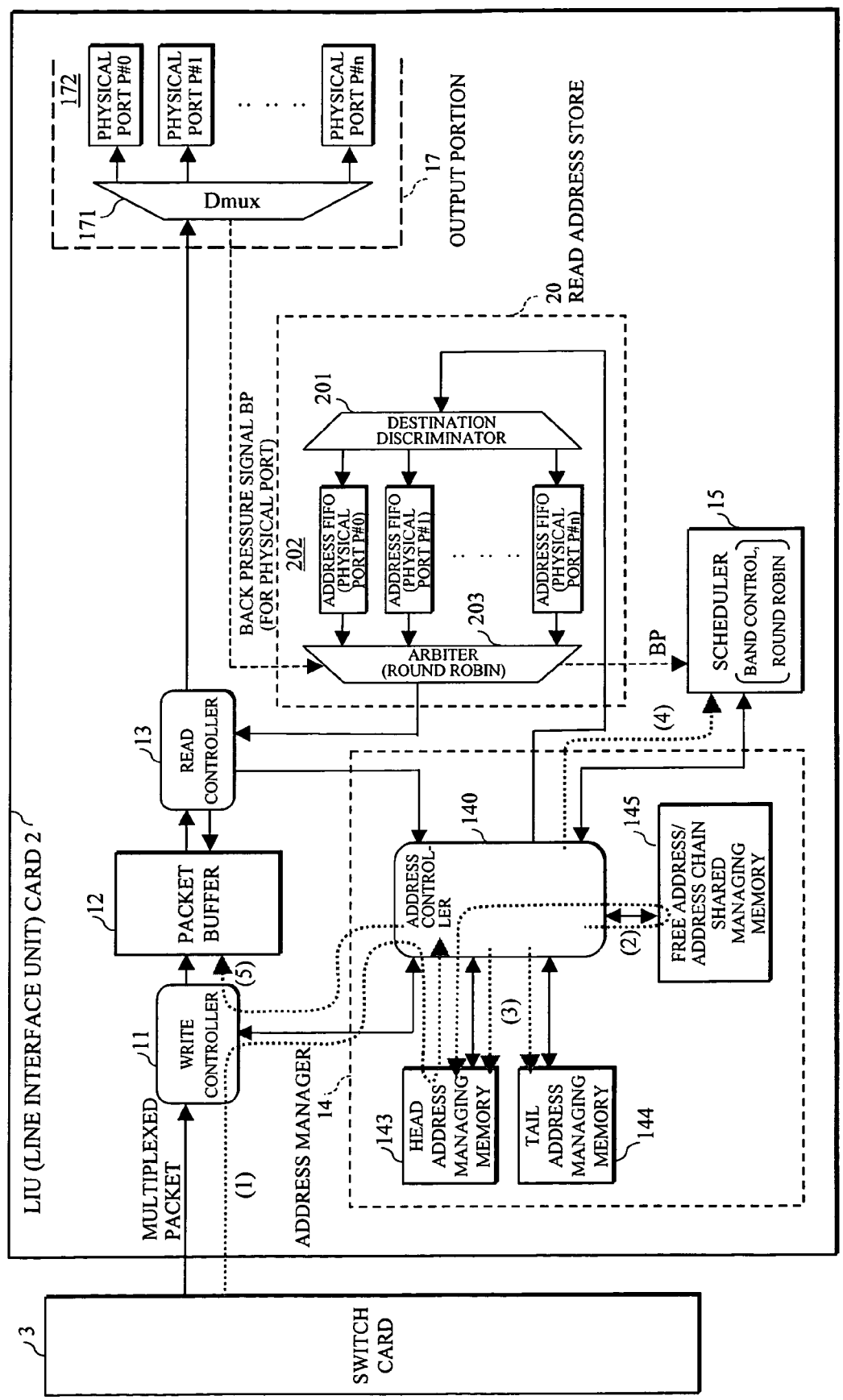
FIG. 3 is a block diagram showing a packet receiving sequence (i) in an LIU card of an embodiment of a packet transmission method and device.
Figure 4:
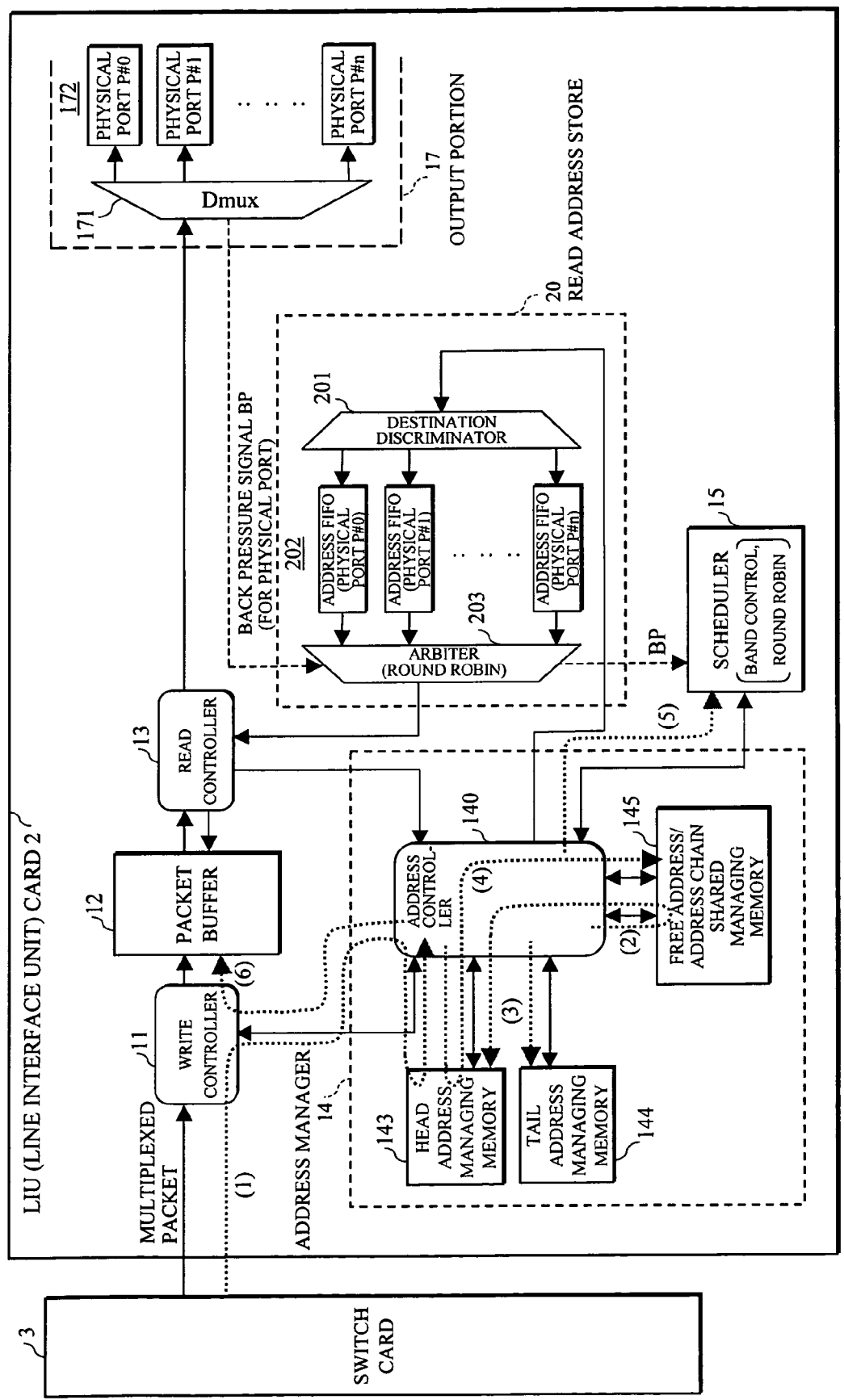
FIG. 4 is a block diagram showing a packet receiving sequence (ii) in an LIU card of an embodiment of a packet transmission method and device.

Packet Receiving Operation: FIGS. 3 and 4

An operation of the LIU card 2 used in this embodiment shown in FIG. 1 at the time of receiving packets will now be described referring to FIGS. 3 and 4:

First, an operation (i) at the time when the first packet is received for a certain destination will be described along flows indicated by reference numerals (1)-(5) shown in FIG. 3 as follows:

(1) At the time of receiving packets, the write controller 11 notifies received packet information (destination physical port number, packet length, etc.) to the address controller 140, which acquires a free head address value from the head address managing memory 143;

(2) The address controller 140 reads the free address/address chain shared managing memory 145 with the free head address value acquired in the above (1), and acquires a free next address value to be written in a free head address value storing area of the head address managing memory 143 (update of free head address value);

(3) The address controller 140 writes the free head address value acquired in the above (1) in the address of the corresponding physical port number of the head address managing memory 143 (update of head address value), and concurrently writes a free head address value in the address of the corresponding physical port number of the tail address managing memory 144 (update of tail address value);

(4) The address controller 140 notifies the received packet information for a read controls to the scheduler 15;

(5) The address controller 140 having acquired the free head address value in the above (1) outputs the free head address value to the write controller 11, which stores the received packet in the address of the packet buffer 12 indicated by the free address value.

Next, an operation (ii) at the time when a packet to a physical port having the same destination is received will be described along flows indicated by reference numerals (1)-(6) shown in FIG. 4 as follows:

(1) At the time of receiving packets, the write controller 11 notifies the received packet information (destination physical port number, packet length, etc.) to the address controller 140, which acquires a free head address value from the head address managing memory 143;

(2) The address controller 140 reads the free address/address chain shard managing memory 145 with the free head address value acquired in the above (1), and acquires free next address value to be written in a free head address value storing area of the head address managing memory 143 (update of free head address value);

(3) The address controller 140 writes the free head address value in the address of the corresponding physical port number of the tail address managing memory 144 (update of tail address value);

(4) The address controller 140 reads the head address value of the corresponding physical port number from the head address managing memory 143, and writes the free head address value acquired in the above (1) in the address area of the free address/address chain shared managing memory 145 indicated by the head address value (chaining operation of address values);

(5) The address controller 140 notifies the received packet information for read controls to the scheduler 15;

(6) The address controller 140 having acquired the free address value in the above (1) outputs the free address value to the write controller 11, which stores the received packet in the address of the packet buffer 12 indicated by the free address value.

It is to be noted that even in a case where a plurality of addresses are used for a single packet depending on a packet length, an acquiring operation of free address and the chaining operation within a packet may be made plural times within a single packet to have a chain connection within a packet, in the same manner as the above noted operation.

Transition of Memory Contents: FIGS. 5A-5D to 12A-12D

The above receiving operation will now be described referring to FIGS. 5-12 showing the storing contents of the memories 143-145 as follows:

1) Default state (before packet input): FIGS. 5A-5D

The memory contents at this initial state are as follows:
Packet buffer 12: All addresses=free;
Shared managing memory 145:
Free next addresses are connected in chain;
Head address managing memory 143:
All head addresses=none,
Free head addresses=0;
Tail address managing memory 144:
All head addresses=none,
Free head addresses=n.

2) Input of packets A1, B1, C1: FIGS. 6A-6D

When having received three packets A1, B1, C1 respectively of the destinations A, B, C, the memory contents are as follows:
Packet buffer 12:
Packets A1, B1, C1 are respectively stored in addresses 0, 1, 2;
Shared managing memory 145:
Chained next address in addresses 0, 1, 2=none;
Head address managing memory 143:
Head address of destination A=0,
Head address of destination B=1,
Head address of destination C=2,
Free head address=3;
Tail address managing memory 144:
Tail address of destination A=0,
Tail address of destination B=1,
Tail address of destination C=2.

3) Input of packet A2: FIGS. 7A-7D

When having received the second packet A2 of the destination A, the memory contents are as follows:
Packet buffer 12: Packet is stored in address 3;
Shared managing memory 145:
Chained next address of address 3=none,
Chained next address of address 0=3;
Head address managing memory 143:
Free head addresses=4;
Tail address managing memory 144:
Tail address of destination A=0→3.

4) Input of packet C2: FIGS. 8A-8D

When having received the second packet C2 of the destination C, the memory contents are as follows:
Packet buffer 12: Packet is stored in address 4;
Shared managing memory 145:
Chained next address of address 4=none,
Chained next address of address 2=4;
Head address managing memory 143:
Free head addresses=5;
Tail address managing memory 144:
Tail address of destination C=2→4.

5) Input of packet A3: FIGS. 9A-9D

When having received the third packet A3 of the destination A, the memory contents are as follows:
Packet buffer 12: Packet is stored in address 5;
Shared managing memory 145:
Chained next address of address 5=none,
Chained next address of address 3=5;
Head address managing memory 143:
Free head addresses=6;
Tail address managing memory 144:
Tail address of destination A=3→5.

6) Input of packet B2: FIGS. 10A-10D

When having received the second packet B2 of the destination B, the memory contents are as follows:
Packet buffer 12: Packet is stored in address 6;
Shared managing memory 145:
Chained next address of address 6=none,
Chained next address of address 1=6;
Head address managing memory 143:
Free head addresses=7;
Tail address managing memory 144:
Tail address of destination B=1→6.

7) Input of packet C3: FIGS. 11A-11D

When having received the third packet C3 of a destination C, the memory contents are as follows:
Packet buffer 12: Packet is stored in address 7;
Shared managing memory 145:
Chained next address of address 7=none,
Chained next address of address 4=7;
Head address managing memory 143:
Free head addresses=8;
Tail address managing memory 144:
Tail address of destination C=4→7.

8) Input of packet B3: FIGS. 12A-12D

When having received the third packet B3 of the destination B, the memory contents are as follows:
Packet buffer 12: Packet is stored in address 8;
Shared managing memory 145:
Chained next address of address 8=none,
Chained next address of address 6=8;
Head address managing memory 143:
Free head addresses=9;
Tail address managing memory 144:
Tail address of destination B=6→8.

Figure 13:
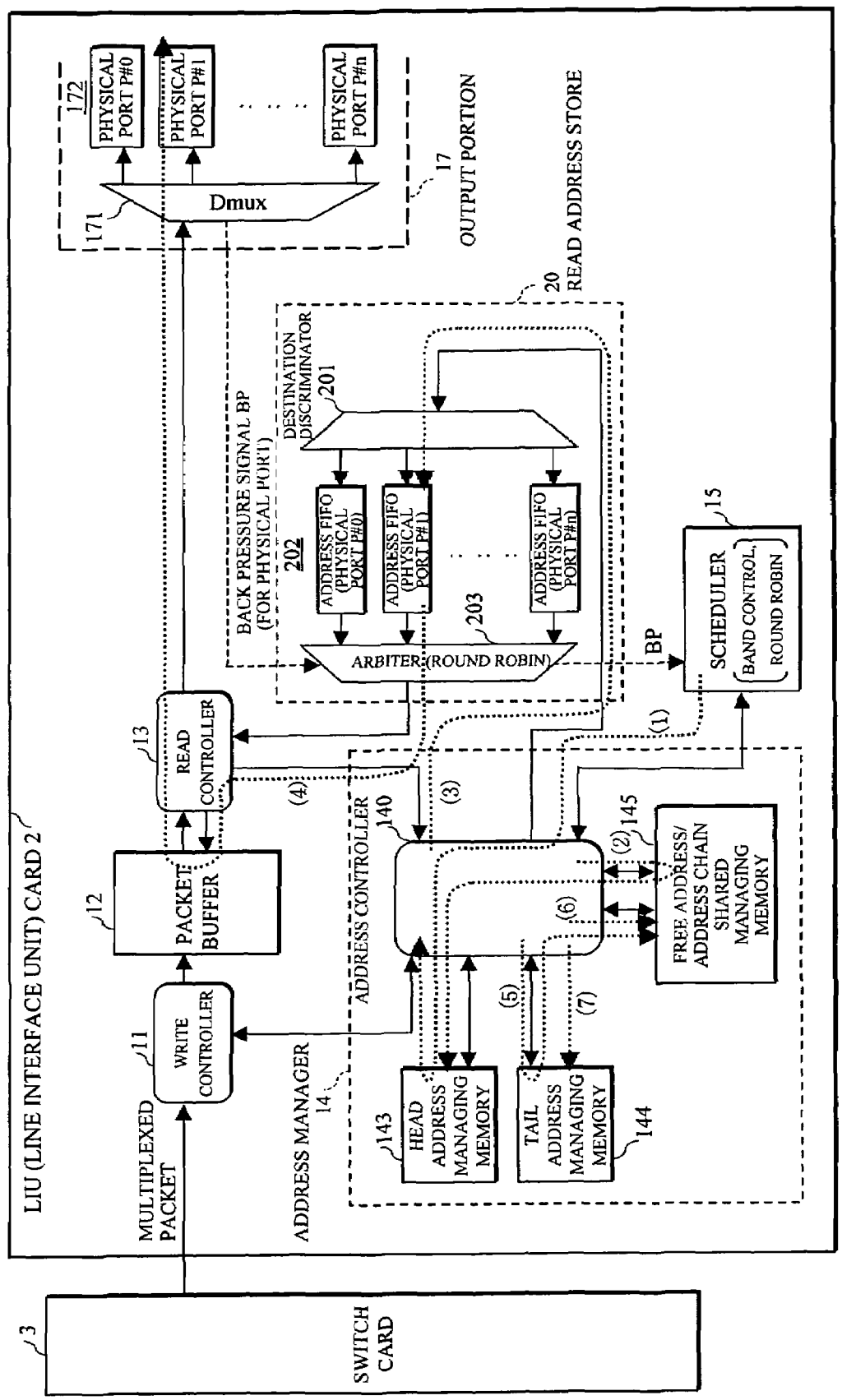
FIG. 13 is a block diagram showing a packet transmitting sequence in an LIU card used in an embodiment of a packet transmission method and device.
Figure 20:
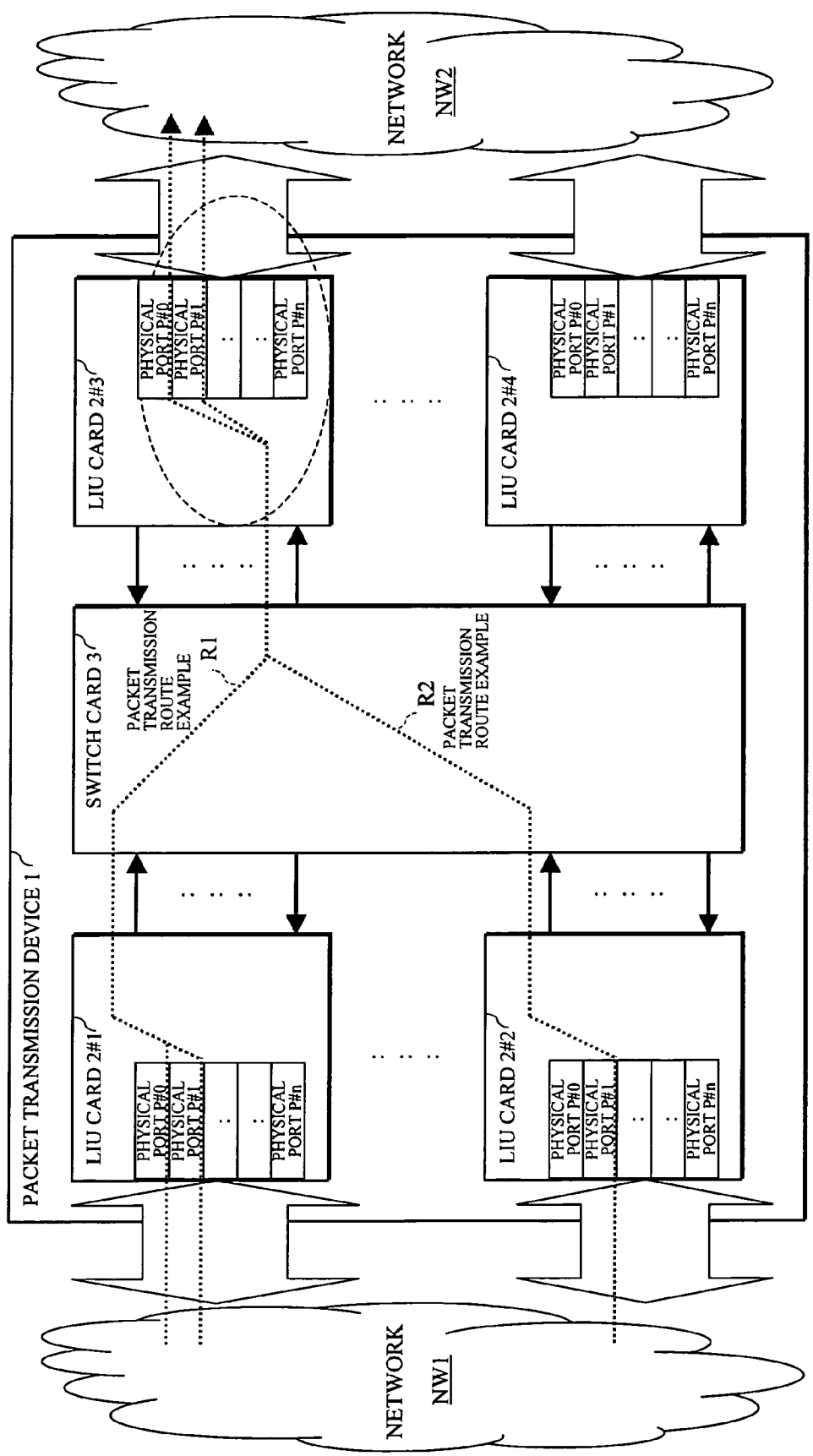
FIG. 20 is a block diagram showing an overall arrangement of a packet transmission device as generally known.

Packet Transmitting Operation: FIG. 13

An operation of the LIU card 2 shown in FIG. 2 at the time of transmitting packets will now be described along flows indicated by reference numerals (1)-(7) shown in FIG. 13 as follows:

(1) The address controller 140 having received the read physical port number determined by the scheduling of the scheduler 15 reads a head address value of destination corresponding to the read physical port number from the head address managing memory 143;

(2) The address controller 140 reads a chained next address from the free address/address chain shared managing memory 145 with the head address value acquired in the above (1), and writes the chained next address value as read in the address of the corresponding physical port number of the head address managing memory 143 (update of head address value);

(3) The address controller 140 outputs the head address value acquired in the above (1) as the read address value to the read address store 20, which stores it in the address FIFO 202 of the corresponding physical port number;

(4) The read address value accumulated in the address FIFO 202 is read from the address FIFO 202 at a read request from the arbiter 203 (for example, a simple round robin operation). In response, the read controller 13 reads the corresponding packet from the packet buffer 12 to be outputted from the corresponding physical port 172 through the Dmux portion 17. It is to be noted that while performing the output control in conformity with the real rate, the Dmux portion 17 stops the outputting at the occurrence of a state where the actual rate is exceeded due to a burst or the like and outputs the back pressure signal BP to the arbiter 203, which stops reading from the corresponding port.

Thus, the output adjusting method (back pressure control etc.) in conformity with the actual rate is the same as the prior art, whereas this embodiment does not perform the output adjustment by packet as in the prior art but achieves adjustments by address (packet division);

(5) The address controller 140 reads the free tail address value from the tail address memory 144 and writes the read address value acquired in the above (1) in the address value area of the free address/address chain shared managing memory 145 (chain connection of free address values);

(6) The address controller 140 writes "free next address=none" in an area of the address value of the free address/address chain shared managing memory 145 acquired in the above (1);

(7) The address controller 140 writes the read address value acquired in the above (1) in a free tail address storing area of the tail address managing memory 144 (update of free tail address value).

It is to be noted that the above (1)-(4) show processings as to packet reading while the above (5)-(7) show processings as to free address.

Transition of Memory Contents: FIGS. 14A-14D to 19A-19D

The above transmitting operation will now be described more specifically referring to FIGS. 14-19 showing contents of the memories 143-145, where the memory contents at the start of transmission are supposed to have the contents shown in FIG. 12:

1) Output of packet A1: FIGS. 14A-14D

When outputting the first packet A1 of the destination A based on the instructions of scheduler 15, the address controller 140 preliminarily stores a head address value 0 of the corresponding physical port (destination A) of the head address managing memory 143 in a FIFO corresponding to the destination A of the address FIFO 202 of the read address store 20. Then, the arbiter 203 provides the head address value 0 of the destination A to the read controller 13 by its arbitrating operation such as a round robin method, whereby the received packet A1 in the head address value 0 of the destination A is read from the packet buffer 12, at which time the memory contents are as follows:
 Packet buffer 12: Address 0=free;
 Shared managing memory 145:
  Free next address of address n=none→0,
  Free next address of address 0=none;
 Head address managing memory 143:
  Head address of destination A=0→3;
 Tail address managing memory 144:
  Free tail address=n→0.

2) Output of packet A2=FIGS. 15A-15D

When outputting the first packet A2 of the destination A, the memory contents are as follows:
 Packet buffer 12: Address 3=free;
 Shared managing memory 145:
  Free next address of address n=none→3,
  Free next address of address 3=none;
 Head address managing memory 143:
  Head address of destination A=3→5;
 Tail address managing memory 144:
  Free tail address=0→3.

3) Output of packet B1: FIGS. 16A-16D

When outputting the first packet B1 of the destination B, the memory contents are as follows:
 Packet buffer 12: Address 1=free;
 Shared managing memory 145:
  Free next address of address 3=none→1,
  Free next address of address 1=none;
 Head address managing memory 143:
  Head address of destination B=1→6;
 Tail address managing memory 144:
  Free tail address=3→1.

4) Output of packet B2: FIGS. 17A-17D

When outputting the first packet B2 of the destination B, the memory contents are as follows:
 Packet buffer 12: Address 6=free;
 Shared managing memory 145:
  Free next address of address 1=none→6,
  Free next address of address 6=none;
 Head address managing memory 143:
  Head address of destination B=6→8;
 Tail address managing memory 144:
  Free tail address=1→6.

5) Output of packet C1: FIGS. 18A-18D

When outputting the first packet C1 of the destination C, the memory contents are as follows:
 Packet buffer 12: Address 2=free;
 Shared managing memory 145:
  Free next address of address 6=none→2,
  Free next address of address 2=none;
 Head address managing memory 143:
  Head address of destination C=2→4;
 Tail address managing memory 144:
  Free tail address=6→2.

6) Output of packet C2: FIGS. 19A-19D

When outputting the second packet C2 of the destination C, the memory contents are as follows:
 Packet buffer 12: Address 4=free;
 Shared managing memory 145:
  Free next address of address 2=none→4,
  Free next address of address 4=none;
 Head address managing memory 143:
  Head address of destination C=4→7;
 Tail address managing memory 144:
  Free tail address=2→4.

It is to be noted that the present invention is not limited by the above-mentioned embodiments, and it is obvious that various modifications may be made by one skilled in the art based on the recitation of the claims.

What is claimed is:

1. A packet transmission method comprising:
 a first step of storing, when a received packet is written in a packet buffer, an address of the packet buffer as a read address for each destination corresponding to a physical port and storing information of the received packet,
 a second step of reading and saving the read address of a destination designated by the received packet information when the received packet is read out of the packet buffer in accordance with a scheduling control, and
 a third step of taking out the saved read address in accordance with an arbitration control and reading a received packet corresponding to the saved read address from the packet buffer.

2. The packet transmission method as claimed in claim 1, wherein the address of the packet buffer is managed for each destination in form of a chain of free address and an address chain of an order of the received packet, the order address chain is written as the read address in the free address chain upon writing the received packet in the packet buffer, and the free address chain is written in the order address chain of the received packet having been written upon reading the received packet from the packet buffer.

3. The packet transmission method as claimed in claim 2, wherein the order address chain is composed of a head address, a tail address, and a chain address connecting the head address to the tail address for each destination, and the free address chain is composed of a free head address at a time when a first received packet is written in the packet buffer, a free next address subsequent to the free head address, and a free tail address indicating a free address of the packet buffer at a time when the received packet is read.

4. The packet transmission method as claimed in claim 1, further comprising a fourth step of generating a back pressure signal forming scheduling stop instructions by monitoring an accumulated quantity of the packet buffer for each physical port to control a read bandwidth from the packet buffer.

5. A packet transmission device comprising:
   a first portion storing, when a received packet is written in a packet buffer, an address of the packet buffer as a read address for each destination corresponding to a physical port and storing information of the received packet,
   a second portion reading and saving the read address of a destination designated by the received packet information when the received packet is read out of the packet buffer in accordance with a scheduling control, and
   a third portion taking out the saved read address in accordance with an arbitration control and reading a received packet corresponding to the saved read address from the packet buffer.

6. The packet transmission device as claimed in claim 5, wherein the address of the packet buffer is managed for each destination in form of a chain of free address and an address chain of an order of the received packet, the order address chain is written as the read address in the free address chain upon writing the received packet in the packet buffer, and the free address chain is written in the order address chain of the received packet having been written upon reading the received packet from the packet buffer.

7. The packet transmission device as claimed in claim 6, wherein the order address chain is composed of a head address, a tail address, and a chain address connecting the head address to the tail address for each destination, and the free address chain is composed of a free head address at a time when a first received packet is written in the packet buffer, a free next address subsequent to the free head address, and a free tail address indicating a free address of the packet buffer at a time when the received packet is read.

8. The packet transmission method as claimed in claim 5, further comprising a fourth portion generating a back pressure signal forming scheduling stop instructions by monitoring an accumulated quantity of the packet buffer for each physical port to control a read bandwidth from the packet buffer.

* * * * *